US012366860B2

(12) United States Patent
Weidenbach et al.

(10) Patent No.: US 12,366,860 B2
(45) Date of Patent: Jul. 22, 2025

(54) SENSOR FUSION IN AGRICULTURAL VEHICLE STEERING

(71) Applicant: Raven Industries, Inc., Sioux Falls, SD (US)

(72) Inventors: Alex John Weidenbach, Sioux Falls, SD (US); Jonathan Eugene Mathews, Rapid City, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 97 days.

(21) Appl. No.: 17/548,497

(22) Filed: Dec. 11, 2021

(65) Prior Publication Data

US 2022/0187832 A1 Jun. 16, 2022

Related U.S. Application Data

(60) Provisional application No. 63/124,374, filed on Dec. 11, 2020.

(51) Int. Cl.
*A01B 69/00* (2006.01)
*A01B 9/00* (2006.01)
(Continued)

(52) U.S. Cl.
CPC ......... *G05D 1/0212* (2013.01); *A01B 69/008* (2013.01); *G05D 1/0231* (2013.01); *G05D 1/0257* (2013.01); *G05D 1/0278* (2013.01)

(58) Field of Classification Search
CPC .. G05D 1/0212; G05D 1/0231; G05D 1/0257; G05D 1/0278; G05D 2201/0201;
(Continued)

(56) References Cited

U.S. PATENT DOCUMENTS 3,342,274 A 9/1967 Wridt, Jr.
4,573,547 A 3/1986 Yoshimur et al.
(Continued)

FOREIGN PATENT DOCUMENTS

BR 102021017293 5/2022
CA 3073713 2/2019
(Continued)

OTHER PUBLICATIONS

"International Application Serial No. PCT/US2021/062969, International Search Report mailed Mar. 21, 2022", 2 pgs.
(Continued)

*Primary Examiner* — Faris S Almatrahi
*Assistant Examiner* — Dana F Artimez
(74) *Attorney, Agent, or Firm* — Schwegman Lundberg & Woessner, P.A.

(57) ABSTRACT

A row steering system of an agricultural machine is provided. The row steering system includes a first sensor assembly configured to detect a first orientation of the agricultural machine relative to a path reference in a field using a first sensor configured to measure a first characteristic. The system also includes a second sensor assembly configured to detect a second orientation of the agricultural machine using a second sensor configured to measure a second characteristic. The system further includes a control module including a first evaluation module to obtain a first confidence in the detected first orientation, a second evaluation module to obtain a second confidence in the detected second orientation, and a selector module to selectively provide one or more of the detected first orientation or the detected second orientation to a machine controller of the agricultural machine based on the first and second confidences.

25 Claims, 16 Drawing Sheets

(51) Int. Cl.
*A01B 69/04* (2006.01)
*B62D 1/00* (2006.01)
*B62D 1/02* (2006.01)
*G05D 1/00* (2006.01)

(58) Field of Classification Search
CPC .......... A01B 69/00; A01B 1/00; G01S 13/865; G01S 17/88
See application file for complete search history.

(56) References Cited

U.S. PATENT DOCUMENTS

| | | |
|---|---|---|
| 5,509,486 A | 4/1996 | Andersen |
| 6,336,051 B1 | 1/2002 | Pangels et al. |
| 7,904,218 B2 | 3/2011 | Jochem et al. |
| 8,019,513 B2 | 9/2011 | Jochem et al. |
| 8,121,345 B2 | 2/2012 | Joche et al. |
| 8,712,144 B2 | 4/2014 | Mas et al. |
| 8,725,361 B2 | 5/2014 | Kellum |
| 9,668,420 B2 | 6/2017 | Anderson et al. |
| 10,524,407 B2 | 1/2020 | Schleicher et al. |
| 10,627,386 B2 | 4/2020 | Saez et al. |
| 11,399,531 B1 | 8/2022 | Sibley et al. |
| 11,470,760 B2 | 10/2022 | Van Roekel et al. |
| 2002/0106108 A1 | 8/2002 | Benson et al. |
| 2007/0001096 A1 | 1/2007 | Wei et al. |
| 2007/0003107 A1 | 1/2007 | Wei et al. |
| 2007/0014434 A1 | 1/2007 | Wei et al. |
| 2007/0271013 A1 | 11/2007 | Jochem et al. |
| 2008/0065286 A1* | 3/2008 | Han .................. G06V 20/588 701/28 |
| 2008/0294309 A1 | 11/2008 | Kaprielian et al. |
| 2010/0063664 A1* | 3/2010 | Anderson ............ G05D 1/0272 701/23 |
| 2011/0231061 A1 | 9/2011 | Reeve et al. |
| 2012/0101861 A1 | 4/2012 | Lindores |
| 2012/0136549 A1* | 5/2012 | Bradai ............... G01C 21/3697 701/93 |
| 2012/0237083 A1 | 9/2012 | Lange et al. |
| 2013/0282200 A1 | 10/2013 | Anderson |
| 2014/0224377 A1 | 8/2014 | Bonefas |
| 2014/0230391 A1 | 8/2014 | Hendrickson et al. |
| 2015/0253427 A1 | 9/2015 | Slichter et al. |
| 2015/0321694 A1 | 11/2015 | Nelson, Jr. et al. |
| 2016/0185346 A1 | 6/2016 | Awamori et al. |
| 2017/0013777 A1 | 1/2017 | Posselius et al. |
| 2017/0018188 A1 | 1/2017 | Ono et al. |
| 2017/0089742 A1 | 3/2017 | Bruns et al. |
| 2017/0090068 A1 | 3/2017 | Xiang et al. |
| 2017/0223889 A1 | 8/2017 | Cavender-bares |
| 2017/0325443 A1 | 11/2017 | Crinklaw et al. |
| 2017/0325444 A1 | 11/2017 | Crinklaw et al. |
| 2017/0339827 A1 | 11/2017 | Anderson et al. |
| 2017/0357029 A1 | 12/2017 | Lakshmanan |
| 2018/0061040 A1* | 3/2018 | Beery ....................... G06T 7/70 |
| 2018/0168094 A1 | 6/2018 | Koch et al. |
| 2018/0188366 A1 | 7/2018 | Kemmer et al. |
| 2018/0199502 A1 | 7/2018 | Briquet-Kerestedjian et al. |
| 2018/0271016 A1 | 9/2018 | Milano et al. |
| 2018/0325012 A1* | 11/2018 | Ferrari ................. A01B 69/008 |
| 2019/0094857 A1 | 3/2019 | Jertberg et al. |
| 2019/0129435 A1 | 5/2019 | Madsen et al. |
| 2020/0020103 A1 | 1/2020 | Sneyders et al. |
| 2020/0053962 A1* | 2/2020 | Dix ..................... A01D 41/1278 |
| 2020/0100422 A1 | 4/2020 | Schleicher et al. |
| 2021/0022282 A1 | 1/2021 | Wallach et al. |
| 2021/0132618 A1 | 5/2021 | Van Roekel et al. |
| 2021/0195824 A1 | 7/2021 | Van Roekel et al. |
| 2021/0331695 A1 | 10/2021 | Ramakrishnan et al. |
| 2021/0357664 A1 | 11/2021 | Kocer et al. |
| 2022/0061236 A1 | 3/2022 | Guan et al. |
| 2022/0183208 A1 | 6/2022 | Sibley et al. |
| 2023/0025245 A1 | 1/2023 | Grover et al. |

FOREIGN PATENT DOCUMENTS

| | | |
|---|---|---|
| CA | 3091297 A1 | 8/2019 |
| DE | 112014000906 T5 | 11/2015 |
| EP | 1473673 A1 | 11/2004 |
| EP | 1738630 A1 | 1/2007 |
| EP | 1738631 A1 | 1/2007 |
| EP | 3877301 B2 | 2/2007 |
| EP | 2517543 A2 | 10/2012 |
| EP | 3033933 A1 | 6/2016 |
| EP | 3342274 A1 | 7/2018 |
| EP | 3414982 | 7/2020 |
| WO | 2013120062 | 8/2013 |
| WO | 2017149526 | 9/2017 |
| WO | 2020037003 A1 | 2/2020 |
| WO | 2022125999 A1 | 6/2022 |

OTHER PUBLICATIONS

"International Application Serial No. PCT/US2021/062969, Written Opinion mailed Mar. 21, 2022", 11 pgs.
Erfani, S., et al., "Comparison of two data fusion methods for localization of wheeled mobile robot in farm conditions", Artificial Intelligence in Agriculture vol. 1, (May 15, 2019), 48-55.
"U.S. Appl. No. 17/131,224, Response filed Jan. 24, 2023 to Non Final Office Action mailed Oct. 24, 2022", 14 pgs.
"U.S. Appl. No. 17/131,224, Notice of Allowance mailed Feb. 16, 2023", 8 pgs.
"U.S. Appl. No. 17/131,224, Corrected Notice of Allowability mailed Mar. 16, 2023", 2 pgs.
"U.S. Appl. No. 17/131,224, Non Final Office Action mailed Oct. 24, 2022", 13 pgs.
"European Application Serial No. 19850326.0, Response filed Nov. 25, 2022 to Extended European Search Report mailed May 3, 2022", 15 pgs.
"U.S. Appl. No. 16/982,495, Response filed May 13, 2022 to Non Final Office Action mailed Feb. 15, 2022", 19 pgs.
"European Application Serial No. 19850326.0, Extended European Search Report mailed May 3, 2022", 16 pgs.
"U.S. Appl. No. 16/982,495, Notice of Allowance mailed Jun. 9, 2022", 10 pgs.
"U.S. Appl. No. 16/982,495, Corrected Notice of Allowability mailed Aug. 3, 2022", 2 pgs.
U.S. Appl. No. 16/982,495 U.S. Pat. No. 11,470,760, filed Sep. 18, 2020, Comparative Agricultural Obstacle Monitor and Guidance System and Method for Same.
U.S. Appl. No. 17/131,224, filed Dec. 22, 2020, Comparative Agricultural Obstacle Monitor and Guidance System and Method for Same.
"International Application Serial No. PCT/US2019/046420, International Search Report mailed Oct. 28, 2019", 3 pgs.
"International Application Serial No. PCT/US2019/046420, Written Opinion mailed Oct. 28, 2019", 26 pgs.
"U.S. Appl. No. 16/982,495, Preliminary Amendment filed Sep. 18, 2020", 23 pgs.
"International Application Serial No. PCT/US2019/046420, International Preliminary Report on Patentability mailed Feb. 25, 2021", 28 pgs.
"U.S. Appl. No. 16/982,495, Non-Final Office Action mailed Feb. 15, 2022", 20 pgs.
"International Application Serial No. PCT/US2021/062969, International Preliminary Report on Patentability mailed Jun. 22, 2023", 13 pgs.
"European Application Serial No. 19850326.0, Communication Pursuant to Article 94(3) EPC mailed Jul. 23, 2024", 8 pgs.
"Canadian Application Serial No. 3,201,409, Examiners Rule 86(2) Report mailed Oct. 2, 2024", 3 pgs.
"Canadian Application Serial No. 3,201,409, Response filed Jan. 15, 2025 to Examiners Rule 86(2) Report mailed Oct. 2, 2024", 17 pgs.

* cited by examiner

SENSOR FUSION IN AGRICULTURAL VEHICLE STEERING

CLAIM OF PRIORITY

This application claims the benefit under 35 U.S.C. § 119(e) of U.S. Provisional Patent Application No. 63/124,374, filed Dec. 11, 2020, which is hereby incorporated herein by reference in its entirety.

FIELD OF THE DISCLOSURE

This document pertains generally, but not by way of limitation, agricultural machines, and more particularly, controlling an agricultural machine based on two or more sensor systems.

BACKGROUND

Contemporary agricultural operations include the use of agricultural machines (e.g., tractors, harvesters, sprayers, seeders, tillers, combines, etc.) to process fields by planting, harvesting, or tending to a crop. Agricultural machines include, in various examples, sensors that monitor one or more functions of the agricultural machine in a field, and provide information to machine controllers for automating, or assisting operators in, the execution of the functions. The sensors provide the machine controllers with information on operation progress, machine status, location and speed of the machine in a field (e.g., by way of GPS antennas), orientation of the machine relative to a path, such as a guidance line. In some examples, a machine controller uses input information from a sensor to conduct automated driving in a field according to predetermined paths, trajectories or guidance lines (hereinafter, "guidance path").

OVERVIEW OF THE DISCLOSURE

In some situations, a machine controller guides an agricultural machine along a guidance path through a field having one or more crop rows. In an example, the guidance path includes a predetermined path or trajectory specified according to an absolute position of the agricultural machine in the field. In another example, the guidance path includes a path or trajectory specified relative to one or more crop rows in the field. The crop rows generally follow the contour of a guidance path (e.g., a guidance path specified according to an absolute position of the agricultural machine) and are, in some examples, considered equivalent to the guidance path. For ease of discussion, guidance path, guidance line or one or more crop rows used to guide an agricultural machine are collectively referred to herein as a path reference.

Some agricultural machines include sensors configured to ascertain information about the agricultural machine as the machine traverses a field according to a path reference. This information, in various examples, includes guidance parameters that are provided to a machine controller, such as a steering control system or a row steering system, to identify and, in some situations, correct deviations from the path reference. In an example, the guidance parameters include a track-angle error (TKE) that corresponds to an angle between the forward direction of the agricultural machine and, for example, the path reference (e.g., one or more crop rows) such that the TKE is 0° when the agricultural machine is following the path reference and the TKE is 90° when the agricultural machine is moving perpendicular to the path reference. Accordingly, TKE (also referred to herein as heading error) is the difference between the agricultural machine's current heading and the path's heading. In another example, the guidance parameters include a cross-track distance (XTK) that corresponds to a lateral distance between the current position of the agricultural machine and the path reference. In yet another example, the guidance parameters include a curvature of the path reference and a determined deviation of the agricultural machine relative to the curvature of the path reference.

In some situations, information a sensor provides to a machine controller is unreliable, for instance because of environmental or technical interference with the ability of the sensor to detect, or generate information that is indicative of, an environment characteristic (hereinafter, "characteristic"). A machine controller then uses this unreliable information to generate corresponding inaccurate or unreliable guidance parameters used by the machine controller to guide the agricultural machine along a path that actually deviates from the path reference. These deviations waste time, resources (e.g., seed, water, agricultural products including sprayed or granular products or the like) and in some examples damage crops, for instance by overrunning crops with agricultural machine ground engaging elements. In an example, information obtained from a vision sensor, such as a camera or other image sensor coupled to an agricultural machine at an elevated location or position relative to one or more crop rows, is used to detect, or differentiate between, crop rows and furrows (where ground engaging elements should travel). The vision sensor is best able to identify and differentiate the crop rows and furrows if the crops are relatively short or if there is a relatively significant visual difference between the crop rows and furrows (e.g., the color of the furrows and crop rows readily contrast, an area covered by a crop row or foliage of a crop is small relative to the area covered by furrows or the like). The accuracy or reliability of this information is reduced by a defect in the sensor or an obstruction, such as tall or canopied crops, in the field of view of the sensor that obscures the crop rows and associated furrows and accordingly frustrates identification of the crop rows.

In another example, information obtained from a non-contact sensor, such as a radar sensor, that is configured to laterally transmit electromagnetic energy across crop rows, is used to detect or identity crop rows. Even with a radar sensor (as well as ultrasound, light detection and ranging (LIDAR) or the like) the accuracy or reliability of the sensor information is reduced by a defect in the sensor that inhibits operation of the sensor, or by the presence of tall or densely packed weeds that obscure crops. In some situations, the defects in the reliability or accuracy of a radar sensor are sufficiently severe to frustrate identification of crop rows and inhibit automated operation of an agricultural machine. In other situations, short crops can be hard to detect with a radar sensor, and may be more readily detected using a vision-type sensor.

Inventors of the present disclosure have recognized that a problem to be solved includes using the measurements of two or more sensors that are each configured to measure different characteristics to improve the reliability or accuracy (hereinafter, "quality") of parameters for control of an agricultural machine and thereby enhance the control of the agricultural machine, for instance to avoid collisions and overrunning of crops, ensure placement of ground engaging elements within furrows between crop rows or the like. In an example, the present disclosure includes techniques (e.g., systems, devices, and methods) for automatically combining a set of one or more shared parameters that are derived from characteristic measurements obtained by two or more sensors (e.g., two or more of the same type of sensors, or two or more different types of sensors), where each sensor is configured to measure a different characteristic (e.g., one or more different views of objects, such as crops, rows or the like from different locations; views of objects with different sensor types; combinations of the same or the like). The one or more shared parameters includes guidance parameters, such as TKE and XTK, that are generated from each sensor with the respective characteristic measurements made by the respective sensors.

A machine controller, in various examples, obtains measurements of a specified characteristic from each sensor. In an example, the machine controller obtains image data that is indicative of crop rows from a first sensor, such as visual sensor. In another example, the machine controller obtains timing and signal intensity data from a second sensor, such as radar senor. In some examples, the first sensor is coupled to the agricultural machine at an elevated location or position relative to the crop rows, such as at a position above a canopy of crops in one or more crop rows, while the second sensor is coupled to the agricultural machine at a lateral location relative to the crop rows, such as at a position below a canopy of crops in the crop rows.

The machine controller obtains, for each sensor, a version of the shared parameters using a specified technique for converting the respective characteristic Measurements to the shared parameters. The resulting shared parameters are accordingly comparable, and in some examples used in combination even though originating from different sensors (e.g., different sensor types, locations or views, combinations of the same or the like). In an example, the machine controller obtains a first version of a set of shared guidance parameters (e.g., TKE and XTK) based on image data obtained from the first sensor using a line fitting technique described in U.S. Pat. Pub. No. US 2020-0020103 A1, which is titled "Detecting Crop Related Row From Image", filed Jul. 11, 2019 and is incorporated herein in its entirety. In another example, the machine controller obtains a second version of a set of shared guidance parameters based on timing and signal intensity data obtained from the second sensor using on the triangulation technique described in described in U.S. patent application Ser. No. 16/982,495, which is titled "Comparative Agricultural Obstacle Monitor And Guidance System And Method For Same", and which was filed on Sep. 18, 2020 and is incorporated herein in its entirety.

In one example, the machine controller obtains a confidence value (hereinafter, "confidence") for each version of a shared parameter. In an example, the confidence value associated with a shared parameter obtained using measurement information provided by a first or second sensor includes a numeric indication of a reliability or accuracy of the shared parameter or a numeric indication of a reliability or accuracy of measurement information used to obtain the version of the shared parameter. Generally, the confidence obtained for a version of a shared parameter decreases with a decreasing ability of a sensor to reliably or accurately obtain measurement information used to generate the version of the shared parameter. The confidence obtained for a version of shared parameter can increase or decrease based on confidence values obtained for another version of the shared parameter or from a confidence associated with the sensor used to obtain the other version of the shared parameter. For example, a high confidence of a shared parameter obtained from a first sensor type, in some examples, is processed by the machine controller to enhance the otherwise lower confidence of the version of the shared parameter from a second sensor type. A separate confidence value is provided for the shared parameters associated with the respective sensors.

A machine controller, in various examples, selectively uses one or more versions of a shared parameter for controlling an agricultural machine. In an example, the machine controller compares the confidence values associated with each version of a shared parameter and uses the version of shared parameter having the largest confidence value, or a confidence value that exceeds a threshold value, to control the agricultural machine. As an example, a machine controller that initially uses guidance parameters a shared parameter) obtained from a vision sensor switches to using guidance parameters obtained from a radar sensor when a confidence associated with the vision sensor is low (e.g., below 50 percent or the like, indicating the canopy of a crop covers the furrows associated with the row or when the vision sensor cannot detect or identify the beginning or end of a row) relative to a confidence associated with a radar sensor (e.g., greater than the vision sensor). In another example, a machine controller that initially uses guidance parameters obtained from a radar sensor switches to using guidance parameters obtained from a vision sensor when a confidence associated with the radar sensor is low (e.g., e.g., below 50, 40, 30 percent or the like, in situations where crops small and difficult to detect in the field view of the radar sensor or because dense weeds block the field of view of the radar sensor but do not hinder an image based sensor) relative to a confidence associated with a vision sensor.

A machine controller, in other examples, combines two or more versions of the shared parameters to obtain composite parameters for controlling the agricultural machine. In an example, the composite parameters include linear combinations of, or other suitable logical or mathematical constructs comprising, two or more versions of the shared parameter generated from measurements captured by two or more or more sensors. The coefficients of the linear combination, in various examples, include one or more gains for adjusting or specifying influence of each version of the shared parameter relative to other versions of the shared parameter. In an example, the coefficients or gains associated with each version of the shared parameter in the linear combination is selected based on the confidence associated with each version of the shared parameter. In another example, the coefficients or gains associated with each version of the shared parameter in the linear combination include weights determined using the confidence associated with each version of the shared parameter. Such weights, in various examples, are the normalized confidences associated with each version of the shared parameters. In certain examples, coefficients or gains associated with a first version of a shared parameter (e.g., from a first sensor) are determined using feedback or other information obtained from a sensor that provides measurement information used to determine a second version of the shared parameter (e.g., from a second sensor). In an example, the machine controller determines that measurements obtained from a vision sensor indicate that crops in crop rows proximate to an agricultural machine having grown in a manner that makes identification of the crop row difficult (e.g., the sensed characteristic has a relatively low confidence as compared to previously observed or measured crops having a higher confidence). Responsive to the determination, the machine controller reduces the coefficient or gain associated with a version of a shared parameter obtained using measurement information provided by a radar sensor. In another example, the machine controller determines that measurements obtained from a radar sensor are indicative of crop row curvature that exceeds a specified threshold for another sensor (e.g., a threshold specified for a vision sensor). In this example, because the specified threshold is exceeded (for the vision sensor) based on analysis done with the radar sensor the machine controller decreases the coefficient or gain associated with the shared parameter obtained using characteristic measurements provided by the vision sensor.

A machine controller, in various examples, use a selected shared parameter or a composite parameter (another example of a shared parameter) to control one or more operations of an agricultural machine. In an example, the selected shared parameters (or the composite parameters) include guidance parameters, such as TKE and XTK, and are used to guide the agricultural machine along a path reference.

In another example, the selected shared parameters or the composite parameters are used to automatically (e.g., without manual user operation or measurement) determine calibration parameters, such as crop row spacing. For example, the selected shared parameters automatically determine calibration parameters under different conditions that otherwise frustrate determination of the calibration parameters, such as early in a planting season when crops are otherwise short and difficult to detect with a radar sensor or late in a season when a crop canopy obscures crop row boundaries otherwise observed with vision sensors. Instead, the present machine controller and the associated system uses two or more sensors (e.g., a vision sensor and a radar sensor, or sensors in different positions, orientations or the like) that are configured to measure different characteristics, for example color (vision) and stalk profiles (radar).

In other examples, the selected shared parameters or the composite parameters are used to control an agricultural machine to improve operation of the machine such as the processing of crop rows in a scenario including field or environmental conditions that limit operation (e.g., fog that decreases confidence in vision sensors or gaps along rows that decrease confidence in radar sensors) of one or more of the sensors while having a limited negative (confidence decreasing) effect on other sensors.

An agricultural machine, in various examples, include a row steering system having a first sensor assembly that is configured to detect a first orientation of the agricultural machine (e.g., a guidance parameter including TKE and XTK) relative to a guidance line or one or more crop rows using a first sensor (e.g., a vision sensor) configured to measure a first characteristic (e.g., to detect or identify crop rows or spacing between crop rows using images of the areas of a field having the crop rows). The row steering system also includes a second sensor assembly that is configured to detect a second orientation of the agricultural machine (e.g., a guidance parameter including TKE and XTK) relative to the guidance line or the one or more crop rows using a second sensor (e.g., a radar sensor) configured to measure a second characteristic (e.g., to detect or identify crop rows or spacing between crop rows using electromagnetic signals, such as radar signals). The row steering system further includes a control module. The control module having a first evaluation module that is configured to obtain a first confidence in the detected first orientation and a second evaluation module to obtain a second confidence in the detected second orientation. The control module further includes a selector module to selectively provide one or more of the detected first orientation or the detected second orientation to a machine controller of the agricultural machine based on the first confidence and the second confidence. If the first and second sensors are the same type of sensor, sensor values can be combined or selected for control using respective confidence levels.

A system for steering an agricultural machine relative to a guidance line or one or more crop rows include a sensor module having a first sensor that, is configured to obtain a first orientation of the agricultural machine relative to the guidance line or the one or more crop rows and a second sensor that is configured to obtain a second orientation of the agricultural machine relative the guidance line or the one or more crop rows. The system further includes an evaluation module that is configured to obtain a first confidence in the first orientation based on the first sensor and a second confidence in the second orientation based on the second sensor. The system further includes a weighting module having one or more modules for assigning a weight to the first orientation and a weight to the second orientation based on the first and second confidences. The weighting module further includes a combiner module for generating a composite or combined orientation of the agricultural machine using the weighted first and second orientations. The system further includes an interface configured to communicate the composite or combined orientation to the machine controller.

A method for controlling (e.g., steering) an agricultural machine according to a guidance path (e.g., a guidance line or one or more crop rows) includes obtaining a first orientation of the agricultural machine relative to the guidance path with a first sensor that is configured to measure a first characteristic and obtaining a second orientation of the agricultural machine relative to the guidance path with a second sensor that is configured to measure a second characteristic. The method also includes obtaining a first confidence of the first orientation and a second confidence of the second orientation. The method additionally includes generating a combined or composite orientation based on a weighted combination of the first orientation and the second orientation, wherein the first orientation is weighted by the first confidence and the second orientation is weighted by the second confidence. In an example generating the combined or composite orientation include comparing the first and second confidences and assigning weights based on the comparison. The method further includes providing the combined orientation to a machine controller for steering the agricultural machine.

Each of the described examples or techniques (e.g., systems, methods, and devices) described herein enables improved automated operation of agricultural machines by enabling the machines to automatically combine, or selectively switch between the use of, shared parameters that are generated by sensors that are configured to measure different characteristics. The improvements enable a machine controller to automatically control the agricultural machine based on confidence in the quality of information obtained from two or more sensors used to guide or inform the operation of the machine.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure, are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

Figure 1:
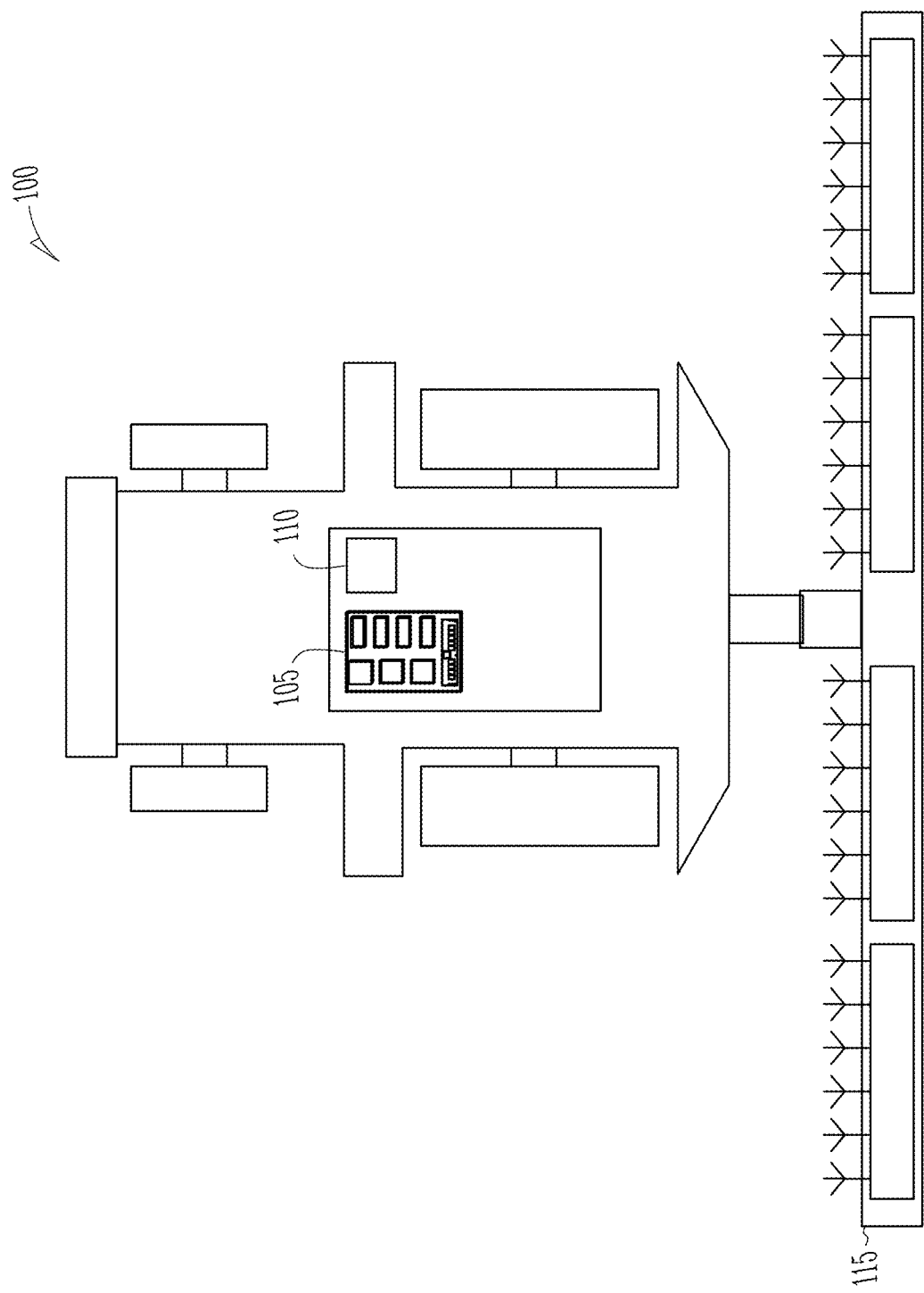
FIG. 1 illustrates an example of a machine that is configured to implement the techniques described herein, according to various embodiments of the present subject matter.

FIG. 1 illustrates an example of a machine 100 that is configured to implement the techniques described herein. The machine 100 includes, in various examples, any agricultural machine that is provided to perform a task such as processing a field by applying a product, such as a mixture of agricultural products, to the field or other land region. In an example, the machine 100 is an agricultural sprayer that is configured to distribute agricultural products to crops. In some examples, the machine 100 includes a machine controller 105, one or more sensors 110, and an implement 115. The machine controller 105 includes, in various examples, one or more hardware circuits or software applications that are configured to control the operation of the machine 100, such as by generating a guidance vector and automatically steering the machine according to the guidance vector and input received from one or more of the sensors 110. The sensors 110 include, in various examples, any of the position, orientation, behavioral, or other sensors described herein. The implement 115 includes, in various examples, any machine actuatable or controllable implement, such as a boom of a sprayer, harvester head, planter row section (or sections), cultivator or the like, for conducting agricultural operations in a field including applying a product in a field.

Figure 2:
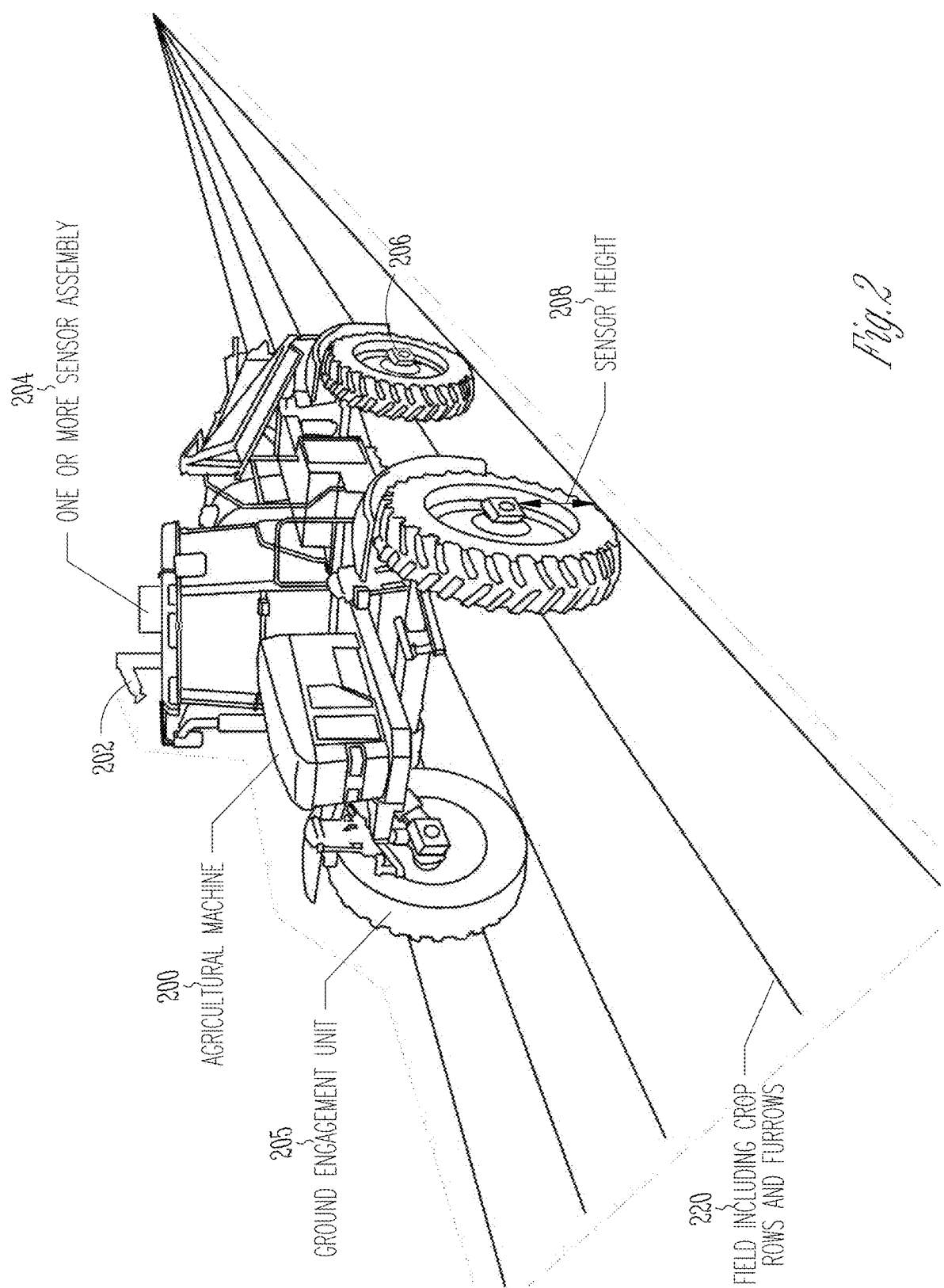
FIG. 2 illustrates an example of an agricultural machine including two or more sensors that are configured to measure or detect characteristics and provide measurements of such characteristics to a machine controller for determining one or more guidance parameters, according to various embodiments of the present subject matter.

FIG. 2 illustrates an example of an agricultural machine 200 including two or more sensors that are configured to measure or detect characteristics and provide measurements of such characteristics to a machine controller for determining one or more guidance parameters, such as TKE and XTK. The provided row steering system uses multiple sensors (radar, camera based, LIDAR, ultrasound, mechanical elements or the like) and either chooses a sensor that is trusted (e.g., with a sufficient confidence) or blends the values together into a combined sensor reading to pass along to a navigation controller. A machine controller uses measurements obtained from each sensor to calculate a confidence value between 0 and 100 corresponding to the reliability or accuracy of measured characteristics and conveys the confidence values to the system. In some examples, there are situations a radar sensor will have a high solution quality (and associated relatively high confidence value) and the camera-based sensor will have a low solution quality (and associated relatively low confidence value). The algorithm compares these two measurements and chooses the sensor with a higher confidence, in an embodiment. One permutation of low and high confidence measurements is encountered when operating in canopied corn. The camera system detects a "sea of green" and has difficulty differentiating rows the vehicle should steer along. In the canopied corn scenario, the radar sensor readily identifies and differentiates rows (because it is mounted below the canopy and laterally directed at the crop and associated stalks) thus its confidence is high. The machine controller then chooses to use the radar sensor in this scenario because of the relatively higher confidence.

The agricultural machine 200 includes one or more vision sensor assemblies 202 including, for example, a digital video camera or LIDAR device. The one or more vision sensor assemblies 202 are, in one example, mounted at an elevated position relative to the field, crop canopy, or ground engagement units on the machine and are configured to capture images of a field 220 including crop rows and intervening furrows. The images are analyzed by the machine controller to determine one or more of cross track error or heading error. The agricultural machine 200 further includes one or more sensor assemblies 204 including, for example, a GPS antenna, real time kinematics (RTK) system or receiver/transmitter or other sensor device that may sense characteristics associated with one or more of cross track error, heading error or the like.

In various embodiments, the agricultural machine 200 includes one or more ground engagement units 205 (e.g., wheels, axles or tracks), including one or more ground engagement unit mounted sensor assemblies 206 configured to provide measurements useful for determining XTK or TKE. These ground engagement unit mounted sensor assemblies 206 can be mounted to point inward under the machine (e.g., to point to an opposing wheel or ground engagement element), or mounted to point outward away from the machine. A machine 200 can have two or more of these sensors (e.g., a different sensor can be coupled to each ground engagement unit of the machine). In some instances, the sensors are coupled to the machine at a sensor height 208 below the canopy of crops and are configured to measure across one or more crop rows. A machine controller can use measurements generated one or more of these sensors, or other sensors mounted on the machine, to determine XTK or TKE. The machine controller selects a sensor based on, for example, a confidence in the measurements provided by the sensor or a confidence in a row determination based on data provided by the sensor.

For each type of sensor (e.g., vision, radar, GPS sensor), the machine controller uses a different method of calculating the XTK, TKE errors from the sensed characteristics (e.g., a sensor solution). In various embodiments, the sensor solution for a particular sensor (e.g., radar, GPS, image-based sensor) provides the following information: for cross track error, the perpendicular distance from the target row or guidance line; for heading error, the angle error relative to the target heading (for straight rows or where the line heading is 0 degrees); and curvature offset. When using radar sensors, these can be measured directly and used to determine cross track error, heading error and curvature error. In some embodiments, vision and radar sensors can provide cross track error, heading error and curvature error relative to a row. These corresponding measurements of error values can be compared across available sensors and used to compare respective sensor confidences and select a best solution based on the comparison.

Figure 3A:
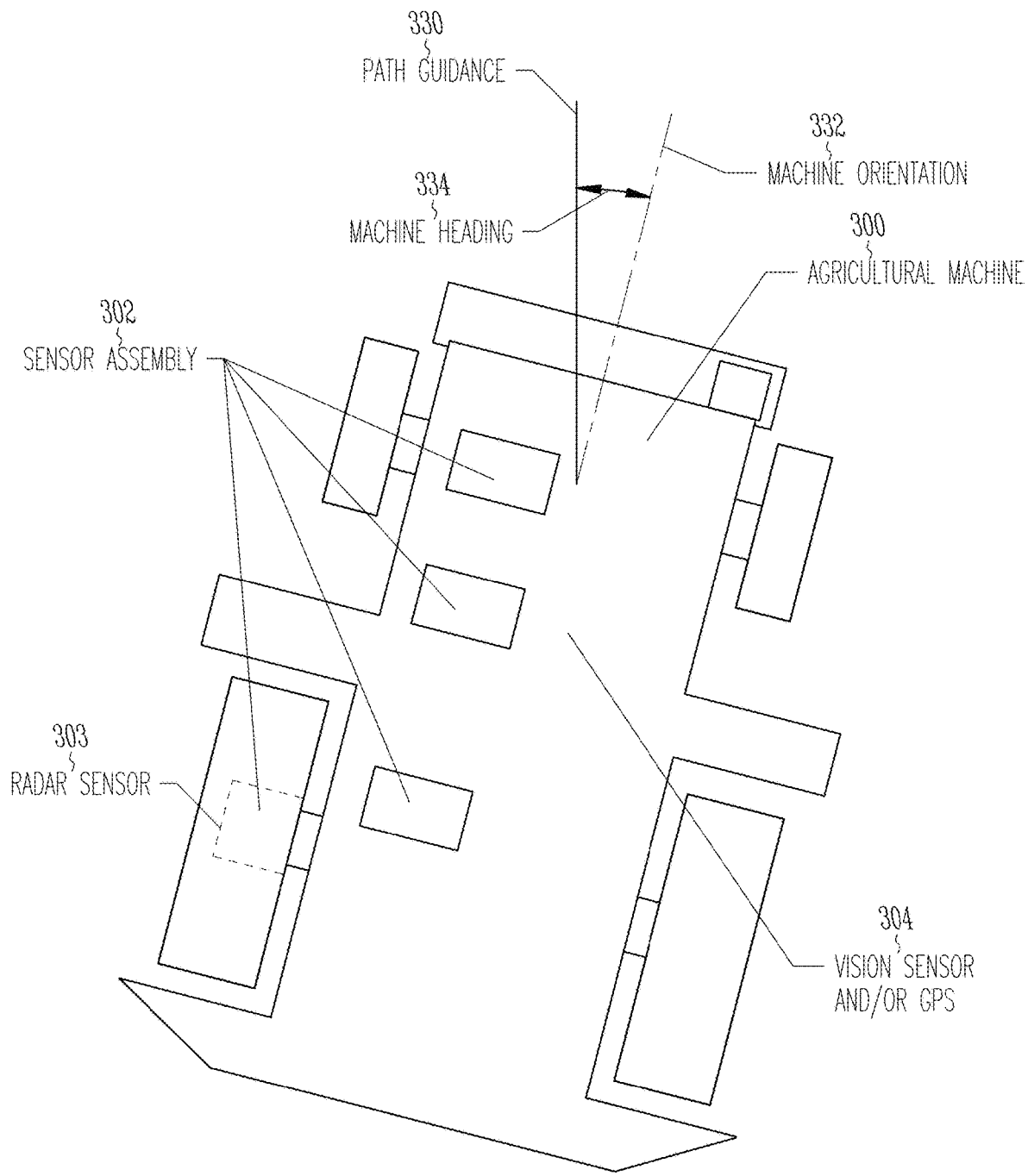
FIGS. 3A and 3B illustrate examples of determining cross track error and heading error, according to various embodiments of the present subject matter.
Figure 3B:
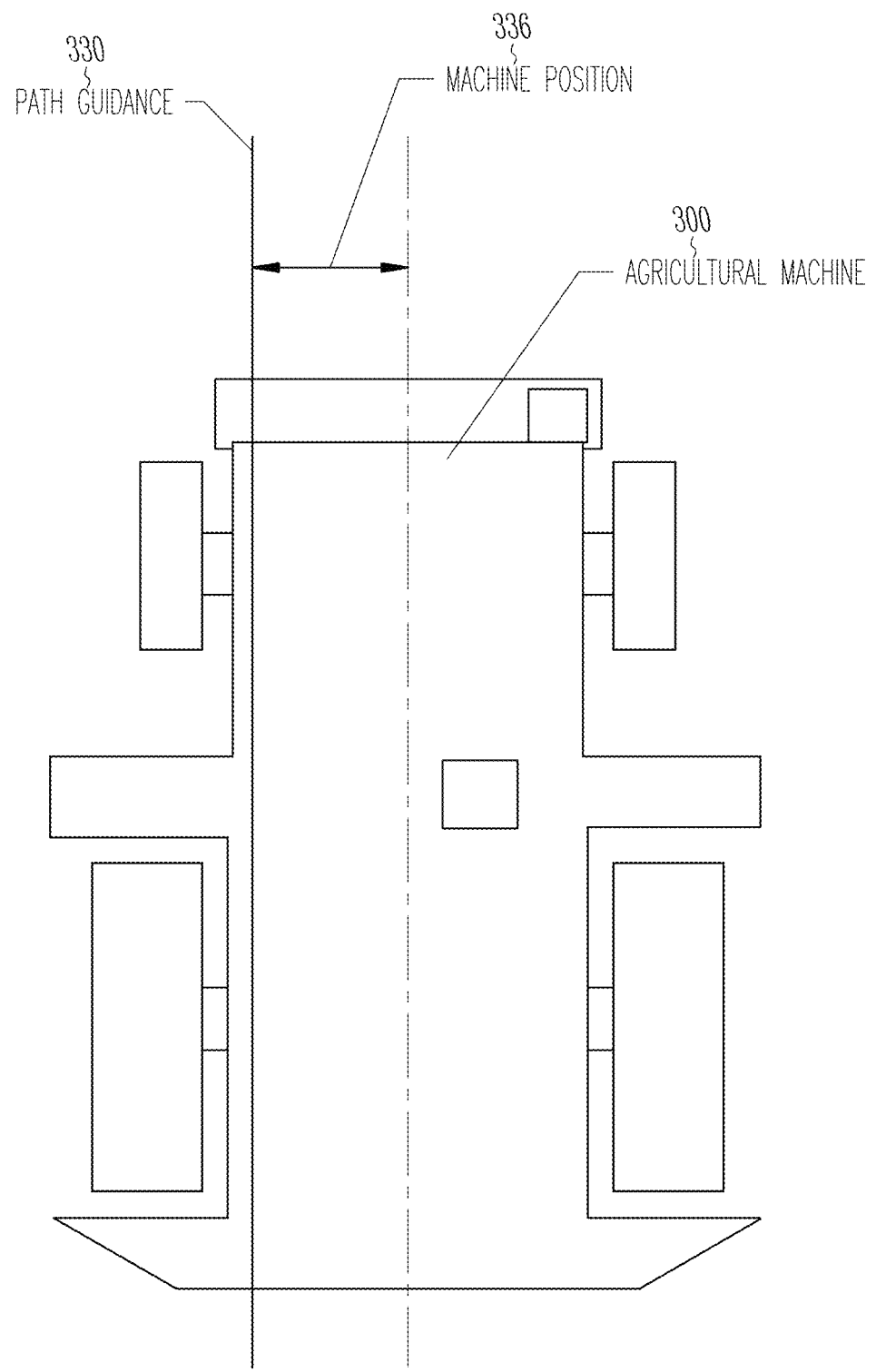

FIGS. 3A and 3B illustrate examples of determining cross track error and heading error. In FIG. 3A, an agricultural machine 300 includes a controller used to determine heading error as an angle 334 of the difference between machine orientation 332 (machine heading and position) and path guidance 330 of the machine 300. The controller uses data received from one or more sensor assemblies 302, such as radar sensor assembly 303 and vision or GPS sensor 304 to determine the angle 334. The one or more sensor assemblies 302 include one or more sensors such as radar, LIDAR, ultrasound, vision, tactile, or any other suitable sensor, such as electromagnetic, acoustic or mechanical sensor, including satellite navigation receivers/transmitters such as GPS devices. The sensor assemblies 302 can include circuits, housing, coupling and interfacing devices and wires, and sensors, in various examples. In FIG. 3B, an agricultural machine 300 includes a controller used to determine cross track error (XTK) as a (lateral) machine position 336 relative to the path guidance 330 of the machine 300, in various embodiments.

Figure 4:
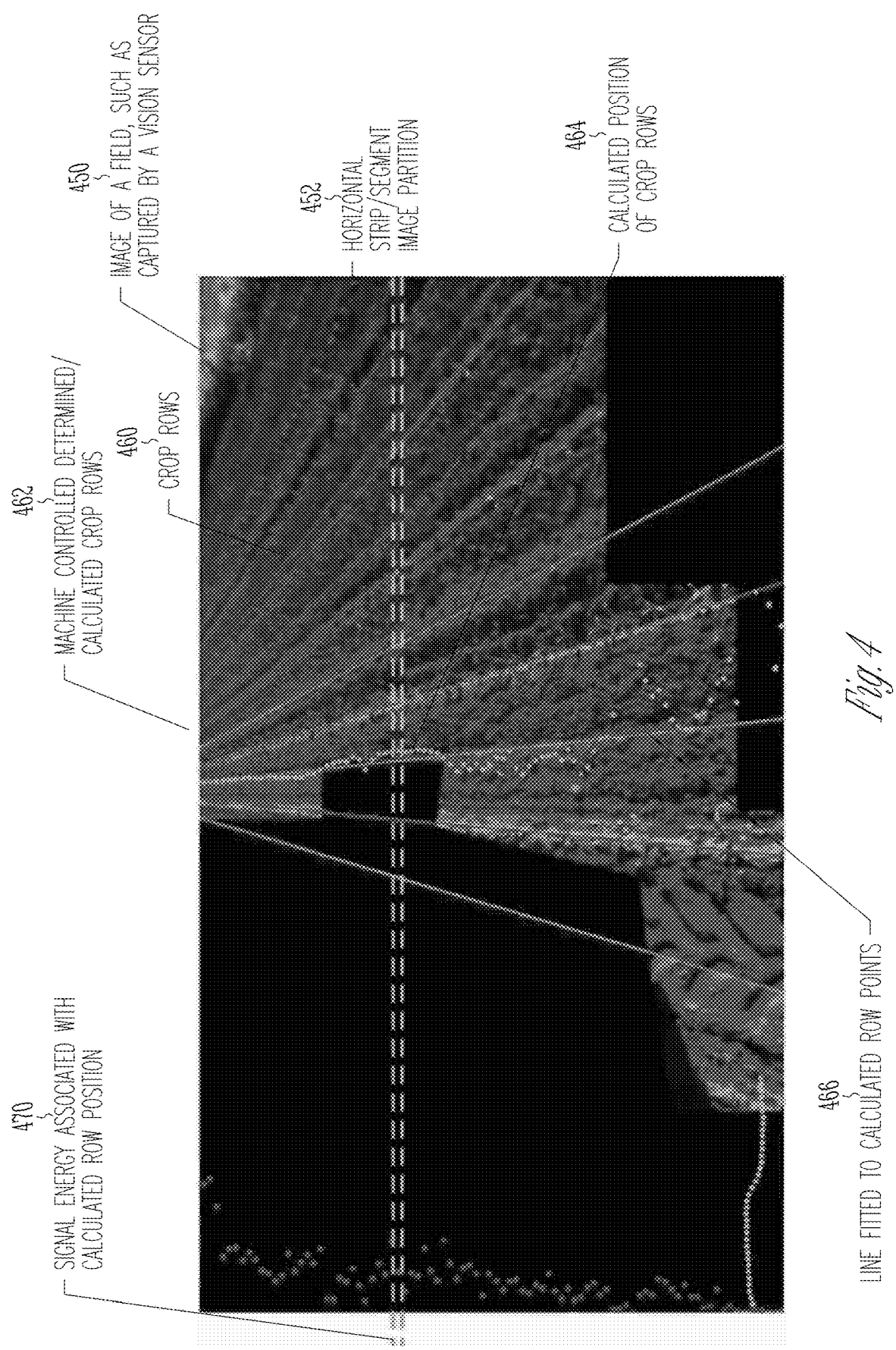
FIG. 4 illustrates an example of determining confidence in crop row detection using characteristic measurements of a field generated by a vision sensor, according to various embodiments of the present subject matter.

FIG. 4 illustrates an example of determining confidence in crop row detection using characteristic measurements (e.g., images) of a field generated by a vision sensor. In various embodiments, the present subject matter provides a quality and confidence determination method, such as for determining/calculating the confidence in row detection using an image 450 obtained from a vision sensor. The image 450 shows crop rows 460 and intervening furrows in a field to be traversed by an agricultural machine, such as the machine 200 in FIG. 2. In an example, the image 450 is split into one or more horizontal strips 452. In one embodiment, the number of horizontal strips is a plurality, such as 90 component strips. Other numbers of horizontal strips can be used without departing from the scope of the present subject matter. For each horizontal strip the present subject matter calculates a position 464 of the row, as illustrated in the diagram, and a signal energy 470, as illustrated by the dots on the left edge of the diagram, wherein dots farther from the left edge indicate higher signal energy.

In various embodiments, a signal energy 470 associated with a calculated row position is determined based on, for example, how clearly a crop or other row indicator can be differentiated from a soil or other furrow indicator (e.g., differentiation between brow and green pixels in image). In various embodiments, to make a confidence determination, the controller (such as machine controller 105 in FIG. 1) looks for brown/green differentiation and consistency with a line. The present subject matter determines a higher confidence for both, and lower confidence for one or zero of these determinations, in various embodiments. A line is fit to the identified row, a transformation is taken from the image to world space (x, y coordinates and determination of XTE and Heading Error) and then XTE and Heading Error are determined from a vehicle line (direction vehicle is heading from the rear axle) relative to the identified line (e.g., the crop row), in various embodiments.

The present subject matter combines the signal energies (e.g., energies associated with an estimated row) by summing or aggregating using any suitable mathematical or statistical technique to create a signal quality (e.g., an aggregate indicator of the quality/strength of row points estimate). The present subject matter then fits a line 462, 466 to the dots showing the calculated crop row position 464 and calculates a line-fit quality (e.g., using linear regression or other suitable mathematical or statistical curve or line fitting technique). The signal quality and line-fit quality are then combined to get an overall quality (e.g., a quality of confidence in the vision sensor based row determination). The quality of confidence is a value that the confidence level is drawn from, in various embodiments. In one embodiment, the combined overall quality (or confidence level) is in the range of 0 to 100. Other ranges can be used without departing from the scope of the present subject matter.

Figure 5A:
FIGS. 5A-5B illustrate a homography transformation for converting from an image space to a world space, according to various embodiments of the present subject matter.
Figure 5B:
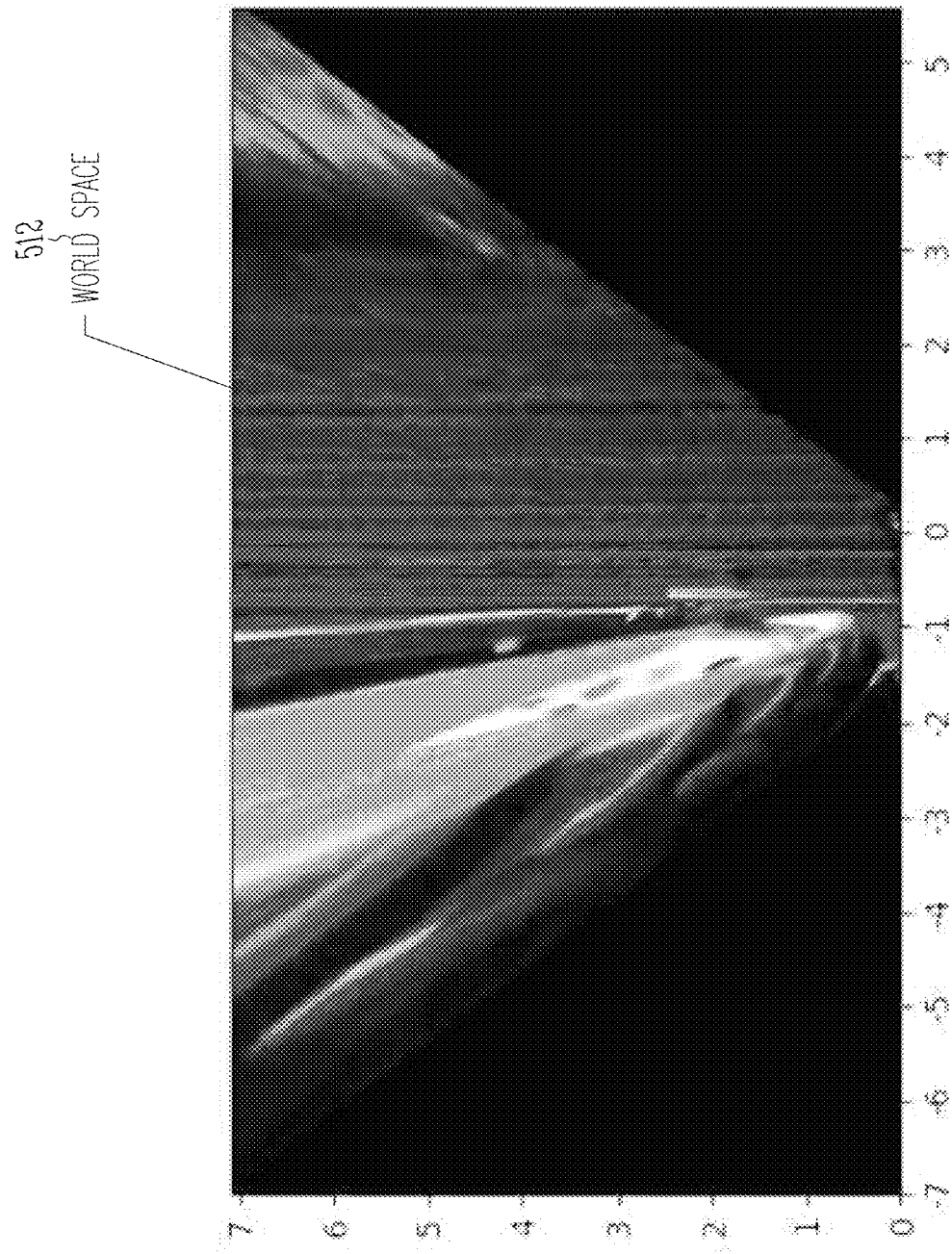

FIGS. 5A-5B illustrate a homography transformation for converting from an image space 502 to a world space 512. FIG. 5B is an example showing distortion correction applied. The homography transformation uses camera distortion correction, in various embodiments. Without the distortion correction, the transformation shown in FIG. 5A includes taking a position (x, y) in an acquired crop row image, augmenting it to (x, y, 1) and multiplying by a 3×3 matrix that is determined based on the height and pitch of the camera, in an embodiment. This calculation provides a new location (X, Y, Z) that, when divided by Z, results with (u, v, 1) where u=X/Z and v=Y/Z, such that u and v are then the coordinates of the same point projected onto a different plane. In one embodiment, the present subject matter projects from the image plane to the ground plane as illustrated in FIG. 5B.

Figure 6A:
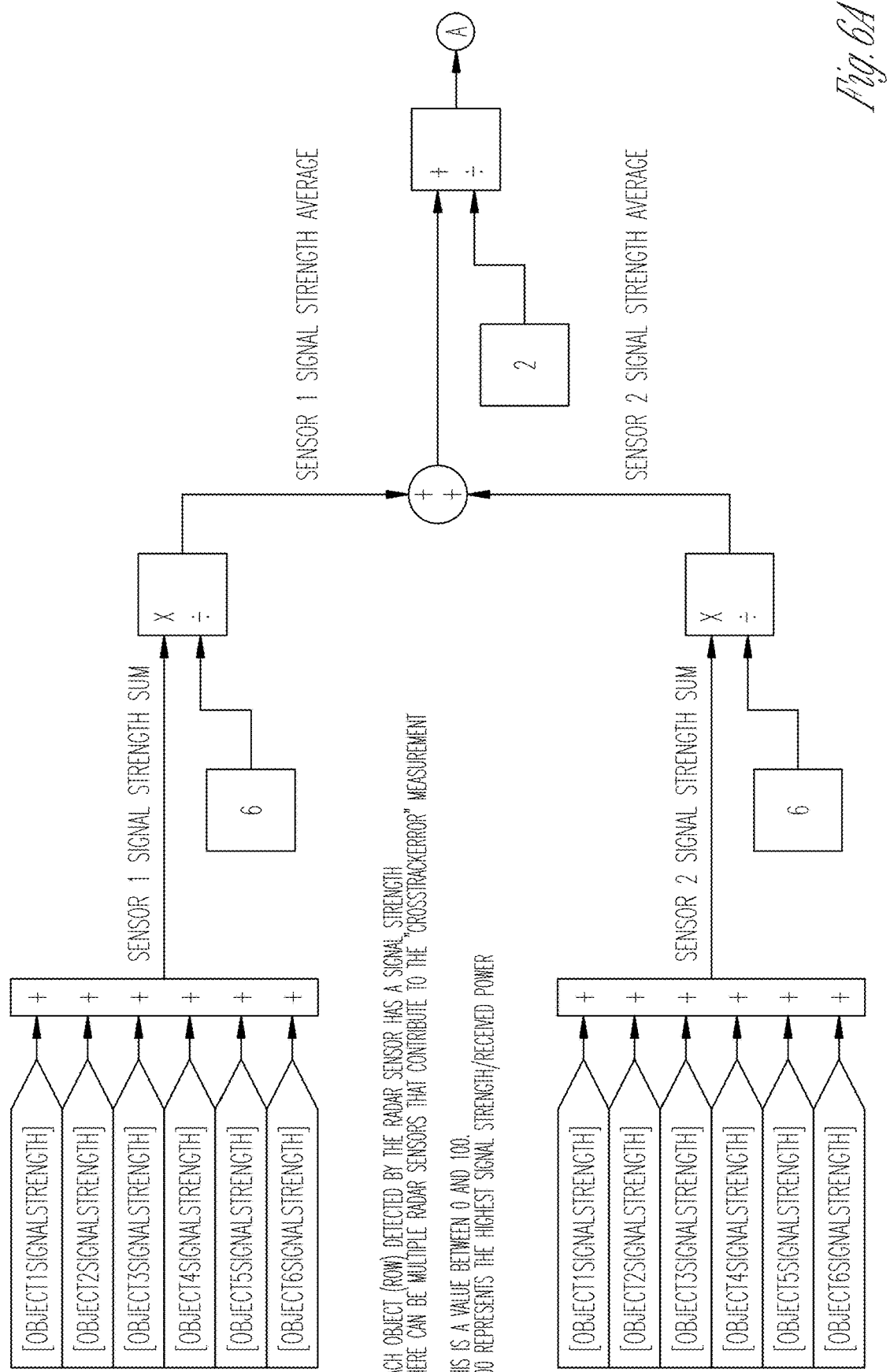
FIGS. 6A-6C illustrate an example of determining confidence in crop row detection using characteristic measurements of a field generated by a radar sensor, according to various embodiments of the present subject matter.
Figure 6B:
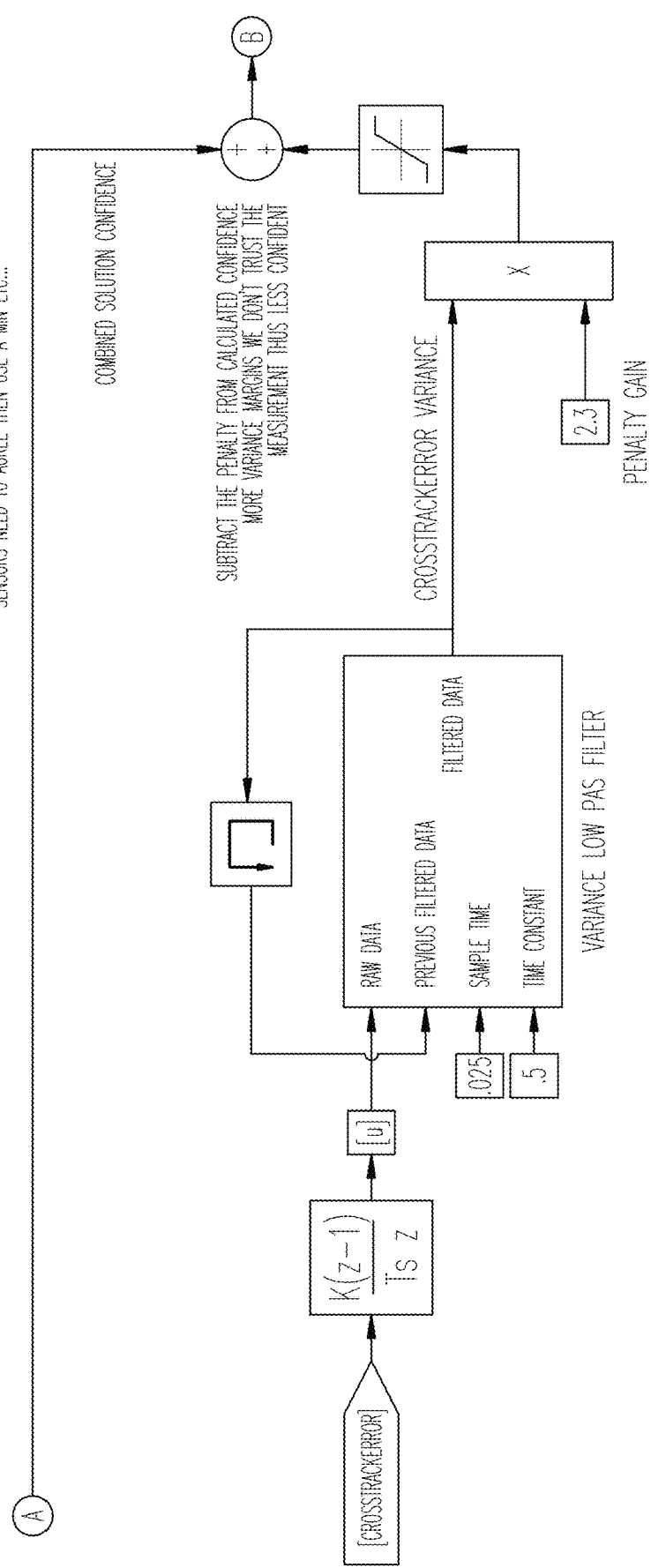
Figure 6C:
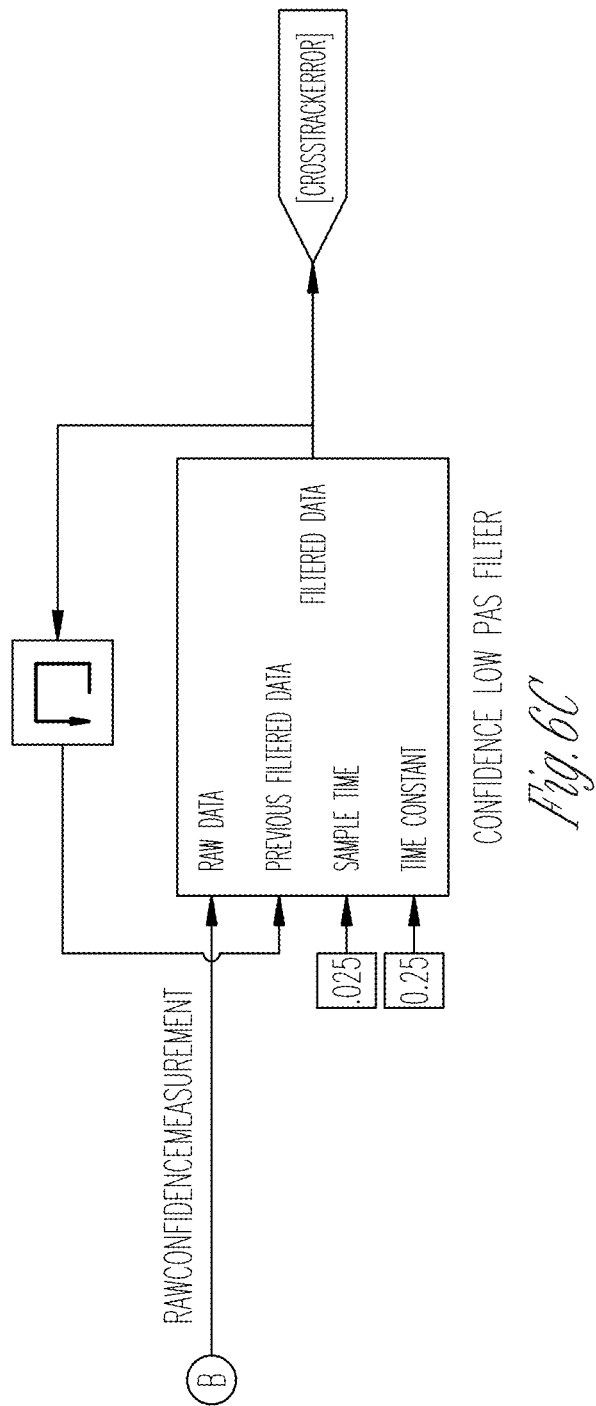

FIGS. 6A-6C illustrate an example of determining confidence in crop row detection using characteristic measurements of a field generated by a radar sensor in contrast to the vision sensor example shown in FIGS. 5A-5B and described herein. In various embodiments, each object or row detected by the radar sensor has a signal strength. Additionally, in various systems there are one or more radar sensors that each contribute to a cross track error measurement. The signal strength for each of the one or more sensors is a value between 0 and 100 (or a corresponding range), in various embodiments. In some embodiments, multiple signal strength readings are evaluated and processed including, but not limited to, summing, averaging, identification of minimum or maximum signal strength or the like. The processed signal strength is then combined to obtain an overall signal strength (e.g., combined sensor solution confidence), which can be tuned for performance based on the number of sensors used. For example, if only one sensor is to be used, then a maximum signal strength can be applied, but if multiple sensors are to be used then a minimum signal strength can be applied. The depicted embodiment uses cross track error measurement from the center of a wheel of an agricultural machine to a center of a crop row furrow, and a cross track error variance can be determined. The cross track error variance can include a range of values of XTK, for example a curve or plot such as a bell curve with a peak representing the XTK and a width affecting confidence. The cross track error variance is then used to determine a variance confidence penalty. The variance confidence penalty is in one example subtracted from the combined sensor solution confidence to provide, a raw confidence measurement, which is optionally run through a low pass filter to obtain a final solution quality for the sensor, in various embodiments.

Figure 7:
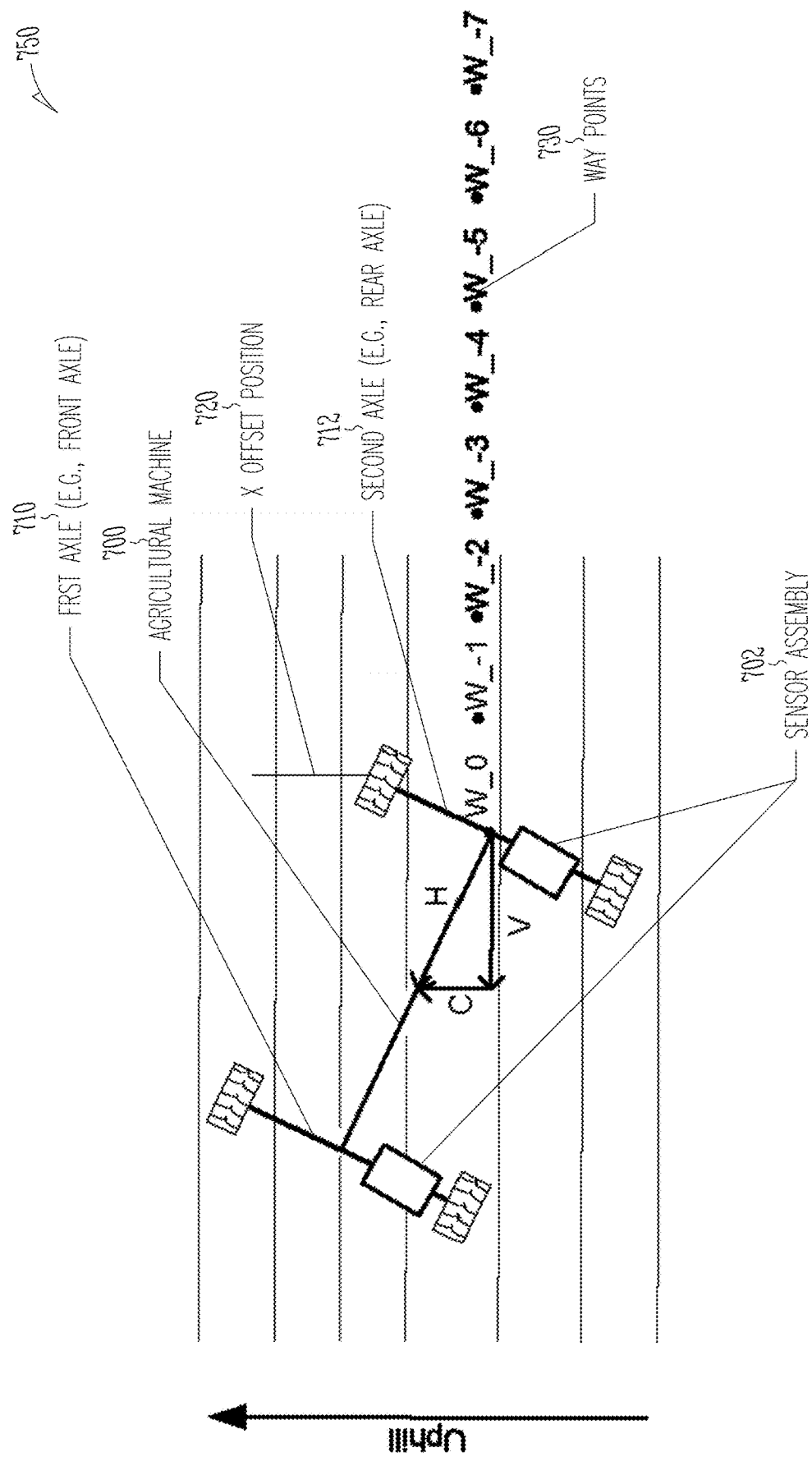
FIG. 7 illustrates example of determining the heading of a machine traversing a sloped hill using characteristic measurements obtained from two or more sensors, according to various embodiments of the present subject matter.

FIG. 7 illustrates example 750 of determining the heading (e.g., and the associated TKE) of an agricultural machine traversing a sloped hill using characteristic measurements obtained from two or more sensors. In contrast, previous example discussed herein included the agricultural machine conducting operations on a relatively level field. In the depicted embodiment, an agricultural machine 700 is shown traversing a sloped hill, and the machine 700 includes a first axle 710 and a second axle 712, where one or more of the axles includes a sensor assembly 702. Additional numbers of axles can be used without departing from the scope of the present subject matter. The sensor assembly 702 includes one or more sensors, such as radar, LIDAR, ultrasound sensor, vision sensor, tactile sensor, electromagnetic sensor, acoustic sensor, mechanical sensor, or other suitable sensor such as a satellite navigation receiver/transmitter of a GPS device, RTK system or combined GPS and RTK system. The present subject matter provides for using one or more sensors (such as radar and/or image sensors) to correct for sidehill drift, such as when the front wheels may appear to be accurately positioned between crop rows while the rear wheels drift/slid over adjacent crop rows and in some examples even drive over adjacent crop rows into proximate furrows. This causes damage to crops and deviation of agricultural implements relative to crops and crop rows that may negatively affect accurate application of an agricultural product or conducting of an agricultural operation. In this embodiment, the machine is pointed uphill in order to counter the force of gravity pulling downhill, for instance on the second axle 712. A GPS sensor can be used to calculate a heading of the machine based on the change in position of the machine over some previous set of waypoints 730 indicated as (w_0, w_–1, . . . w_–7). From a historical position of the machine, it can be difficult to determine the direction the machine is actually pointed because instantaneous or near time steering adjustments are not reflected with historical position changes.

In one embodiment, using a vision sensor, or radar with an additional sensor in the rear, the present subject matter can determine the actual heading of the agricultural machine. For example, one or more sensors can detect the slope of the hill and the machine controller can use this measurement to determine, for example, that actual confidence in the GPS should be low (and the GPS confidence value is accordingly decreased) and use data from the vision or radar sensor along with the additional sensor to determine the actual heading of the vehicle. In FIG. 7, using only GPS with the GPS antenna mounted at the front axle of the vehicle, the machine controller may incorrectly calculate that the rear axle is in the same row of crops as the front axle, when it is actually significantly downhill of the front axle. In an extreme case (depending on the position of the GPS antenna and the severity of the hill), this would mean that one or both sets of wheels could be running over crops when the system is not aware of the positional error.

When the antenna position of the GPS is not over top of the real axle, it is common to project the antenna position backwards along the GPS heading. However, when on a sloped hill the GPS heading does not match the vehicle orientation because the vehicle needs to point up the slope of the hill in order to keep the GPS antenna online, as shown in the waypoints 730 extending along the crop rows, or zero degrees and the vehicle orientation is clearly at an angle. Thus, when the antenna position is projected backwards it is incorrectly projected up the hill relative to the second axle 720 actual position and off of the sprayer thereby continued positioning of the rear wheels to drift off line and run over crops.

The present subject matter uses one or more sensors, such as radar, to compensate for this error. A sensor (e.g., a radar sensor) is placed proximate to the rear ground engaging elements (e.g., proximate to rear tires, the second axle 712) to measure the X offset position 720 of the ground engaging elements relative to the row. Radar can be used to measure the wheel angle relative to the row, relate that to the agricultural machine, and determine the true vehicle orientation, in various embodiments. This allows the machine projection to be corrected (e.g., the radar on the rear wheel in addition to the front), in various embodiments. According to various embodiments, the present subject matter uses a velocity vector (V) as determined using a GPS antenna mounted at a front axle of the vehicle optionally corresponding to the waypoints 730. The present subject matter also uses a heading vector (H) corresponding to the actual vehicle heading/orientation (e.g., determined with the sensors as discussed herein). The present subject matter further uses a crab vector (C) that represents the agricultural machine moving at an angle that is perpendicular to the velocity vector (V) or at an angle between being perpendicular to the velocity vector (V) and the velocity vector (V). Thus, the crab vector may be at or between 0 and 90 degrees from the velocity vector (V).

Figure 8:
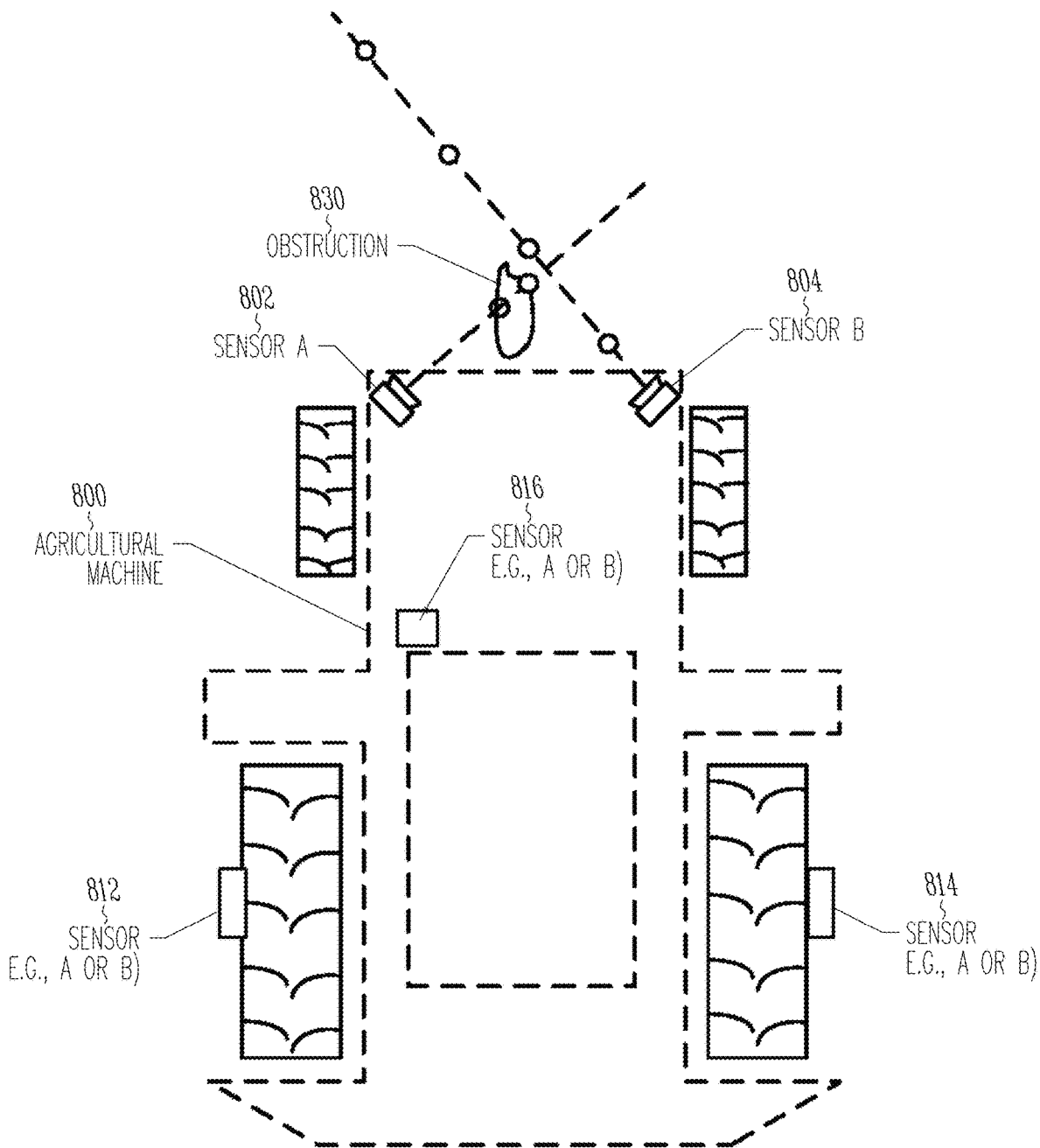
FIG. 8 illustrates an example of an agricultural machine having sensors that are alternatively or cooperatively usable to obtain guidance parameters for automated control of the machine, according to various embodiments of the present subject matter.

FIG. 8 illustrates an example of an agricultural machine 800 having sensors 802, 804, 812, 814, 816 that are alternatively or cooperatively usable to obtain guidance parameters for automated control of the machine. According to various embodiments, the present subject matter provides for switching between sensors in various conditions. Sensor solution or measurement quality can be affected by the conditions in the surrounding environment (e.g., obstructions 830 in the environment) that reduce the confidence in measurements generated by one sensor (e.g., sensor A, 802) more than the confidence in measurement obtained by another sensor (e.g., sensor B, 804). A machine controller can use determined or obtained confidence in each sensor to select a measurement generated by the less obstruction (higher confidence) sensor for calculating cross track error or cross heading error, in various embodiments of the present subject matter. Sensors A and B are in one example the same types of sensors (e.g., both vision sensors, both radar sensors, or the same type of other sensor, such as ultrasound, LIDAR or the like). In another example, the sensors A and B are different types of sensors (e.g., sensor A is a vision sensor and sensor B is a radar sensor, or other different types of sensors). The sensors can be coupled to the machine at the same or different locations or elevations, in various embodiments. As discussed herein, if the image-based sensor solution confidence is low (e.g., with sensor A, 802), the present subject, matter can switch to using the radar sensor measurements (e.g., with sensor B, 804), in an embodiment. In one instance, when bad crop row measurements lead to low confidence, a radar sensor has high confidence and the control module selects the radar sensor. In another instance, when crops are short and hard to detect with radar, this leads to low radar confidence and if the image sensor has high confidence and the control module selects the image sensor.

For example, when canopy covers the furrow, an image-based sensor cannot determine where the rows start and stop and the confidence value for the image-based sensor measurements is relatively low. In another example, when radar-based sensor solution confidence is low, the present subject matter can switch to using an image-based sensor solution, such as when crops are too short and below the radar sensor's field of view or when dense weeds are tall enough to block the radar sensor's field of view but not tall enough to hinder an image-based sensor. In an example, a machine controller looks at whichever confidence value is greater, such as by using a moving average of confidence values and switching from one sensor to another when the average confidence of one sensor is better than that of another sensor by a predetermined amount.

In various embodiments, the present subject matter provides for multi-sensor fusion, e.g., using a combination of weighted sensor solutions from two or more sensors based on confidence. The combined weighted sensor solutions are then provided to the controller (e.g., the control module) for guidance of the agricultural machine in a similar manner to control of the machine with a selected sensor solution. In one example, the present subject matter provides for sensor fusion between one or more of vision sensors, radar sensors and GPS sensors. For example, a multi-variable filter can used to blend the outputs from each sensor into a single solution (e.g., blend errors of each sensor together based on weights):

$$\text{Solution}=(Gr)\text{ErrorRadar}+(Gp)\text{ErrorGps}+(Gv)\text{Error-Vision}$$

Where $1=Gr+Gp+Gv$

In an example, the coefficients Gr, Gp and Gv are determined (e.g., set, modulated or the like) by the present system in order to weight the filter. In example, the coefficients correspond to the confidence values of the respective measurements. For instance, the weights can be based on measurement confidence or a specified mode selected by the user. For example, in a permutation with the image-based sensor having a lower confidence the present subject matter will apply a corresponding lower weight (Gv) when combining the value with one or more other sensor measurements (e.g., from a different vision sensor, radar sensor, GPS sensor or the like). In another permutation if the radar sensor measurement has a relatively high confidence, a corresponding higher weight (Gr) is applied as part of the combined weighted sensor solution.

Accordingly, Gr, Gp and Gv correspond to the confidence of each of the component sensor measurements. The determined error (e.g., one or more of TKE, XTE or the like) is then:

$$\text{ErrorSolution}=(Cr^*Er+Cg^*Eg+Cv^*Ev)/(Cr+Cg+Cv)$$

The coefficients (weights) are, in one example, based on feedback from each sensor such as the confidence value of the associated sensor measurements. In this example, the feedback of a first sensor (e.g., identification of one or more characteristics) modulates a confidence and associated weight of another second sensor. Thus, the present subject matter in a circumstance with the image-based sensor detecting mature crops with fuller canopies (and corresponding lower confidence) the radar measurement is assigned a greater confidence by the control module and corresponding greater weight (Cr). In an example, the greater weight is determined based on a confidence value of the radar sensor measurement and a gain that increases or decreases because of the analysis of dense foliage in the image-based sensor measurement. In a similar manner, where the system determines that a detected row curvature (e.g., measured with the radar sensor) is outside of the vision sensors specification for instance through analysis at the control module, the system decreases the weight (Cv) of the vision measurement sensor by a gain associated with a row curvature value outside of the vision sensor specification.

In various additional embodiments, the present subject matter provides for multi-sensor fusion, e.g., using weighted sensor solutions from two or more sensors based on confidence. In one example, the present subject matter provides for sensor fusion between vision sensors, radar sensors and GPS sensors. For example, when an image-based sensor is used to detect a gap exists in the row (such as a washout area, or previously damaged crop), the control module can improve sensor function by additionally using the radar sensor data. The radar sensor data can be combined with the image-based sensor data to improve identification of gaps (e.g., the radar sensor/controller is updated based on the vision identified gap/bad data zone, to ignore that data instead of reporting that there is no row). In various embodiments, a depth value can be overlayed (when using stereo cameras) with the radar sensor distance for added robustness for detecting rows. Thus, the control module can be used to assess crop damage (from wind, previously driven over rows, drowned out) or crop emergence. In one example, the control module creates a normalized row list between a vision system and a radar system, and each system provides a location and confidence associated with a row. The control module scans for low confidence for a row shared between the two systems to assist in assessing crop damage, in one example.

Figure 10A:
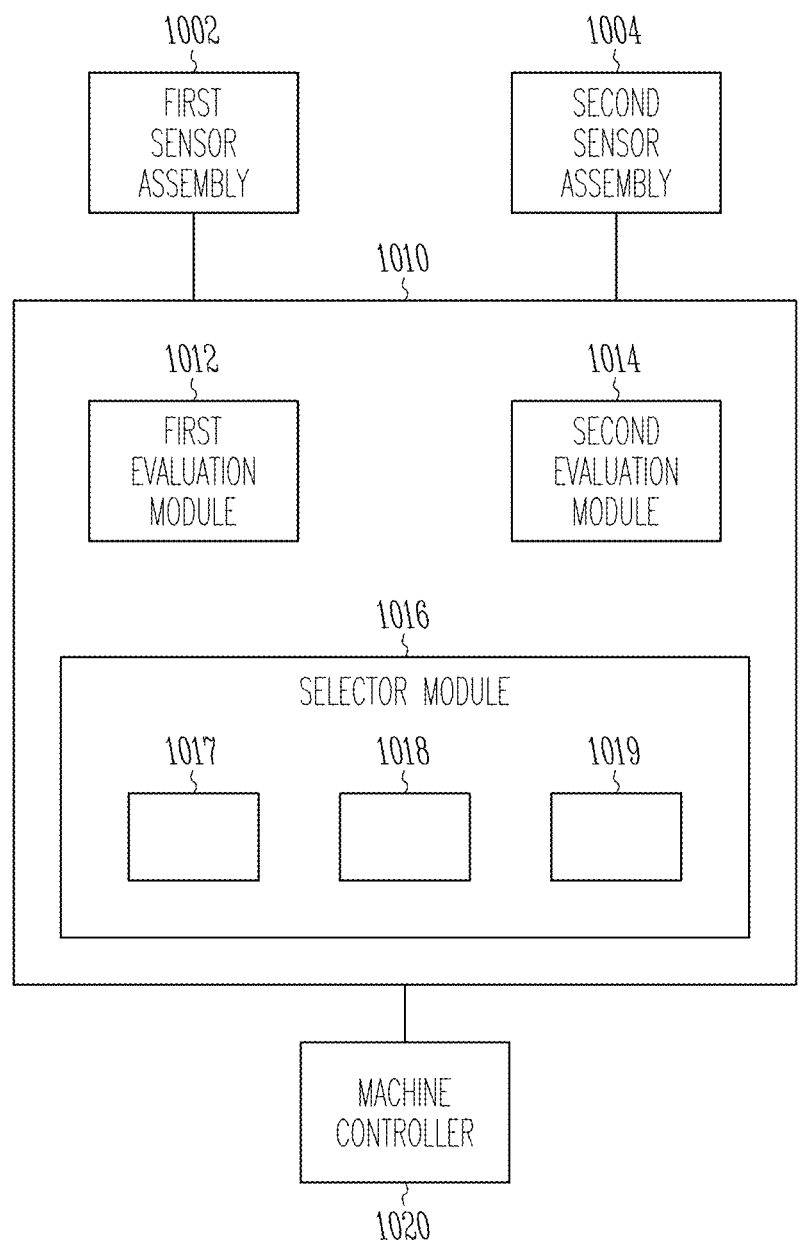
FIG. 10A illustrates a row steering system of an agricultural machine, according to various embodiments of the present subject matter.

FIG. 10A illustrates a row steering system 1000 of an agricultural machine, according to various embodiments of the present subject matter including sensing one or more characteristics, assessing confidence of component measurements, and conducting one or more of selection or combining of the sensor measurements for use with a control system of the agricultural machine (e.g., for one or more of automated or partially automated driving or implement operation). The row steering system 1000 includes a first sensor assembly 1002 configured to detect a first orientation of the agricultural machine relative to a path reference (e.g., one or both of TKE, XTE or the like) in a field using a first sensor configured to measure a first characteristic such as velocity, direction, or the like. The system 1000 further includes a second sensor assembly 1004 (of the same or different type as the first sensor assembly 1002) configured to detect a second orientation of the agricultural machine relative to the crop rows in the field using a second sensor configured to measure a second characteristic. In an example, the first and second characteristics are different (e.g., radar signature, color differentiation or the like). In another example, the first and second characteristics are the same. The system also includes a control module 1010 having a first evaluation module 1012 to obtain a first confidence in the detected first orientation, and a second evaluation module 1014 to obtain a second confidence in the detected second orientation. Optionally, the first and second evaluation modules 1012, 1014 are consolidated as a single or composite evaluation module. The control module further includes a selector module 1016 to select measurements from one of the first or second sensor assemblies 1002, 1004 based on the evaluation of confidences, for instance the measurements of the first sensor assembly 1002 are selected if the associated first confidence is higher, and the converse is true if the confidence of the second sensor assembly 1004 measurements are higher. The control module then uses the selected sensor assembly and its associated measurement (or measurements until variations in confidences change the selection) for operation of the agricultural machine (e.g., for determination of TKE, XTE and associated driving, implement operation or the like). In some examples, measurements or quantities derived from measurements (e.g., TKE, XTE, or the like) are used to determine confidence and selection.

In another example, the system 1000 is configured to combine one or more of the measurements or derived values generated from measurements of the first or second sensor assemblies 1002, 1004. In various embodiments the selector module 1016 includes a weighting module 1017 configured to weight first and second measurements from the sensor assemblies 1002, 1004 or derived values based on the respective measurements (e.g., TKE, XTE or the like). The weights are, in one example, based on one or more of the respective first or second confidences. An orientation combiner 1018 optionally determines a combined measurement or orientation (based on the respective measurements) from the weighted first and second measurements (or orientations). In a similar manner to providing a measurement from one of the sensor assemblies 1002, 1004 or orientation based on measurement to the machine controller 1020, the selector module 1016 is configured, in this example, to provide the combined measurement or orientation to the machine controller 1020.

In various embodiments, the selector module 1016 includes a comparator 1019 configured to compare the first confidence to the second confidence, and the selector module 1016 is configured to selectively provide the first orientation to the machine controller responsive to the first confidence being larger than the second confidence or provide the second orientation to the machine controller responsive to the second confidence being larger than the first confidence. In another example, with the first and second confidences within a specified range, the system 1000 is configured to select one of the first or second sensor assemblies 1002, 1004 for use (e.g., to determine TKE and XTE for guidance) based on a system priority set by the operator, system or the like.

Figure 10B:
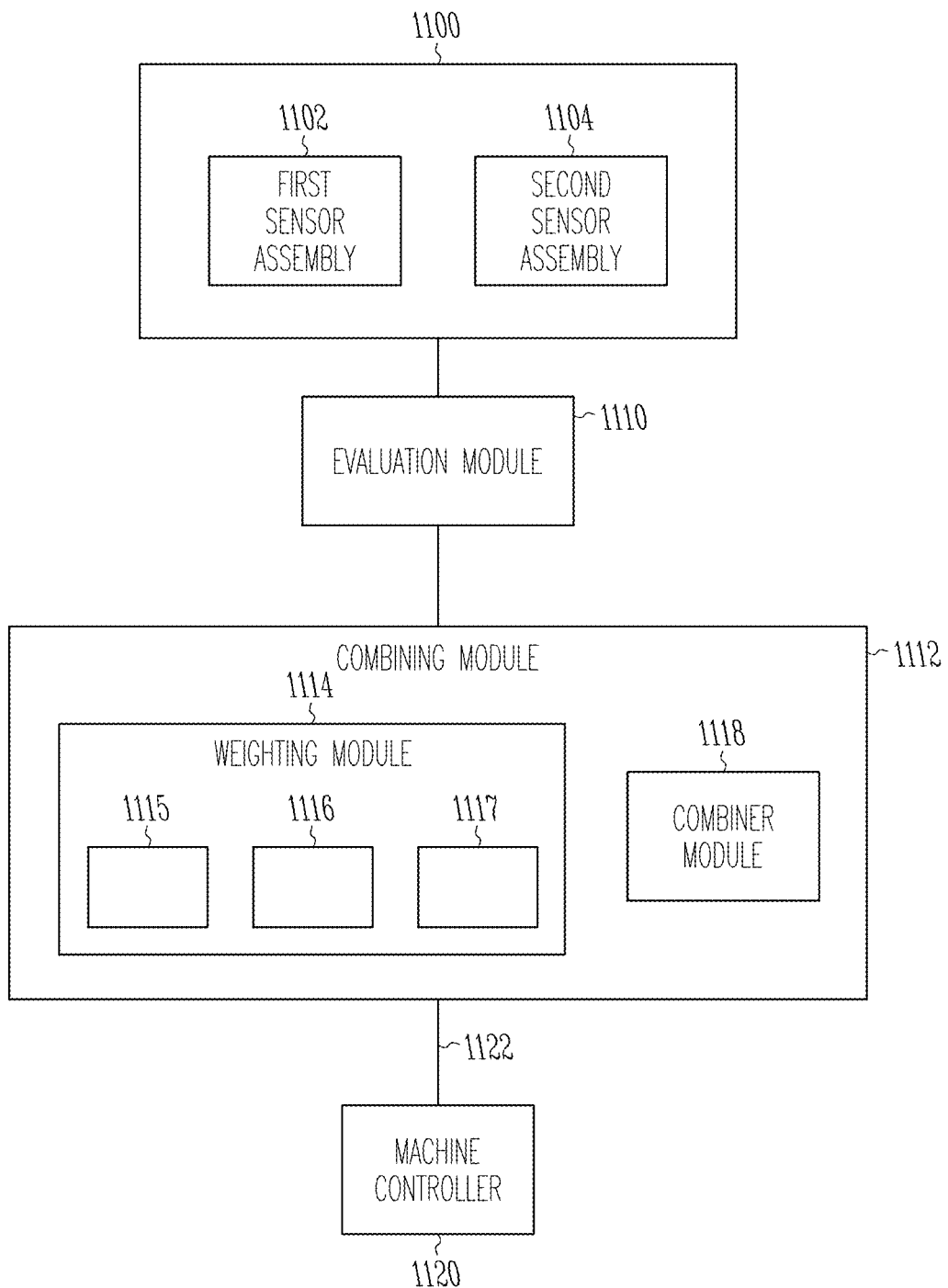
FIG. 10B illustrates a system for steering an agricultural machine relative to guidance path, according to various embodiments of the present subject matter.

FIG. 10B illustrates a system 1150 for steering an agricultural machine relative to guidance path, according to various embodiments of the present subject matter including sensing one or more characteristics, assessing confidence of component measurements, and conducting one or more of selection or combining of the sensor measurements for use with a control system of the agricultural machine (e.g., for one or more of automated or partially automated driving or implement operation). The system 1150 includes a sensor module 1100 including a first sensor assembly 1102 configured to obtain a first orientation of the agricultural machine relative to the guidance path (e.g., one or both of TKE, XTE or the like) based on a first measured characteristic such as velocity, direction, or the like. The system 1150 further includes a second sensor assembly 1104 (of the same or different type as the first sensor assembly 1002) configured to obtain a second orientation of the agricultural machine relative to the guidance path based on a second measured characteristic. In an example, the first and second characteristics are different (e.g., radar signature, color differentiation or the like). In another example, the first and second characteristics are the same. The system also includes an evaluation module 1110 configured to obtain a first confidence in the first orientation based on the first sensor assembly 1102 and a second confidence in the second orientation based on the second sensor assembly 1104. The system further includes a combining module 1112 configured to generate a combined orientation of the agricultural machine based on a weighted combination of the first orientation and the second orientation, the combining module having a weighting module 1114 configured to assign first and second weights to respective first and second orientations based on one or more of the respective first or second confidences, and a combiner module 1118 to generate the combined orientation using the weighted first and second orientations. An interface 1122 configured to communicate the combined orientation to a machine controller 1120. In some examples, measurements or quantities derived from measurements (e.g., TKE, XTE, or the like) are used to determine confidence and combination.

In another example, the system 1150 is configured to combine one or more of the measurements or derived values generated from measurements of the first or second sensor assemblies 1102, 1104. In various examples, the weighting module 1114 includes a position combiner 1115 configured to generate a composite position from the first and second positions based on weighted first and second measurements from the sensor assemblies 1102, 1104 or derived values based on the respective measurements (e.g., TKE, XTE or the like). The weights are, in one example, based on one or more of the respective first or second confidences. An angle combiner 1116 optionally generates a composite angle from the first and second angles based on the weighted first and second orientations. In a similar manner, an association module 1117 is configured to generate a composite orientation including the combined position and the combined angle using the measurements from one or more of the sensor assemblies 1102, 1104.

Figure 10C:
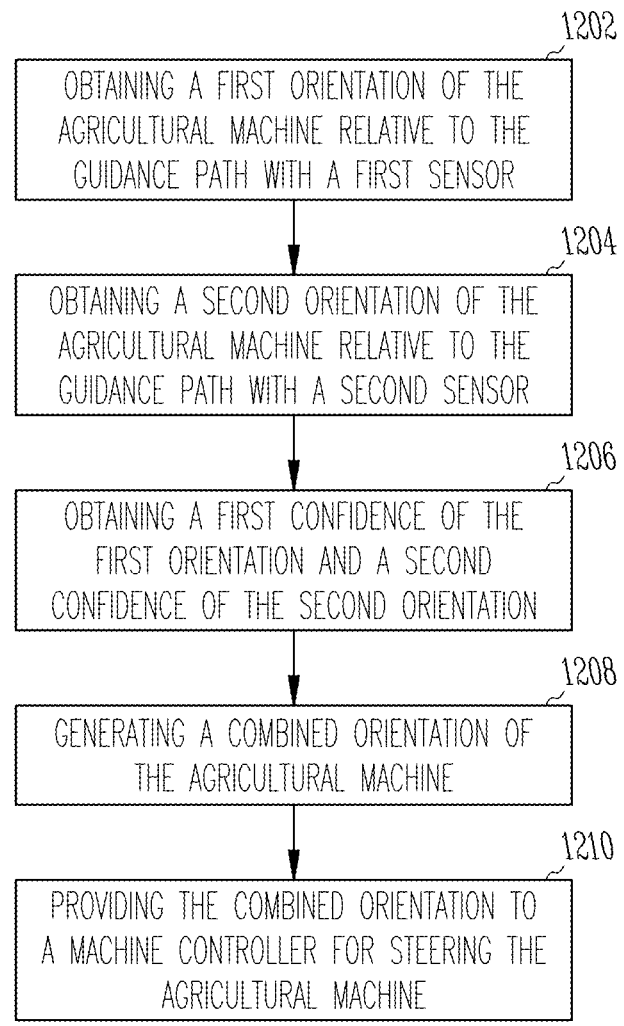
FIG. 10C illustrates a method for controlling an agricultural machine according to guidance path, according to various embodiments of the present subject matter.

FIG. 10C illustrates a method for controlling an agricultural machine according to guidance path, according to various embodiments of the present subject matter. The method includes obtaining a first orientation of the agricultural machine relative to the guidance path with a first sensor, at step 1202. At step 1204, the method includes obtaining a second orientation of the agricultural machine relative to the guidance path with a second sensor. The method also includes obtaining a first confidence of the first orientation and a second confidence of the second orientation, at step 1206. At step 1208, the method further includes generating a combined orientation of the agricultural machine by, for example, comparing the first confidence with the second confidence, assigning a first and second weights to the respective first and second orientations based on the comparison, and generating the combined orientation using the weighted first and second orientations. The method includes providing the combined orientation to a machine controller for steering the agricultural machine, at step 1210.

In various examples, the method further includes configuring the first sensor to couple to the agricultural machine at an elevated location relative to the path reference for detecting the first orientation from the elevated location directed toward the path reference; and configuring the second sensor to couple to the agricultural machine at a lateral location relative to the path reference for detecting the second orientation from the lateral location directed across the path reference. In some examples, obtaining the first confidence comprises decreasing the first confidence relative to the second confidence responsive to a detected increase in a height of crops in the guidance path. In some examples, obtaining the first confidence comprises decreasing the first confidence relative to the second confidence responsive to a detected increase in a size of density of a canopy of crops in the path reference. In various examples, obtaining the first confidence comprises increasing the first confidence relative to the second confidence responsive to a detected curvature in the path reference.

Figure 9:
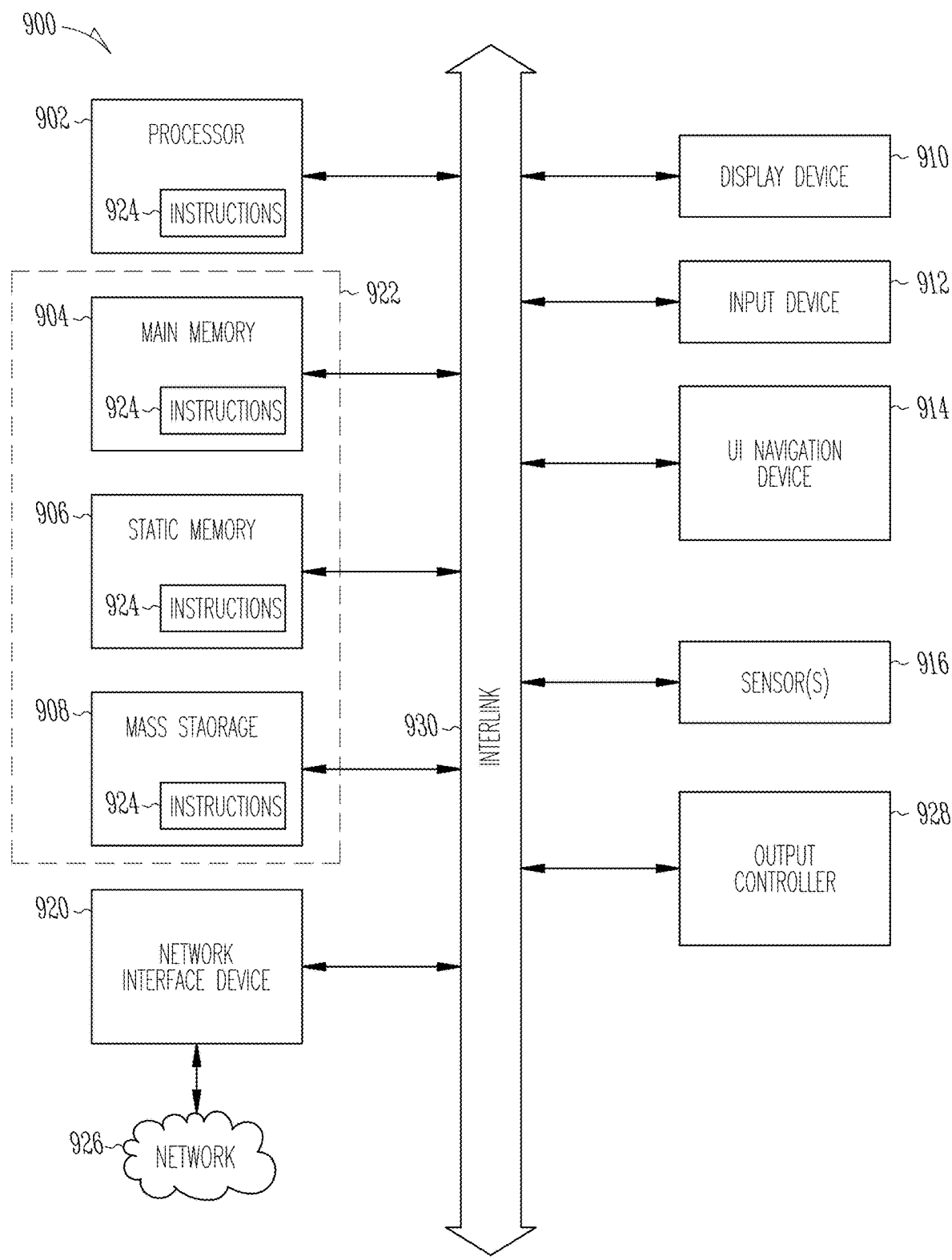
FIG. 9 illustrates a block diagram of an example machine upon which any one or more of the techniques discussed herein can be performed, according to various embodiments of the present subject matter.

FIG. 9 illustrates a block diagram of an example machine 900 upon which any one or more of the techniques (e.g., methodologies) discussed herein can perform. Examples, as described herein, can include, or can operate by, logic or a number of components, or mechanisms in the machine 900. Circuitry (e.g., processing circuitry) is a collection of circuits implemented in tangible entities of the machine 900 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 900 follow.

In alternative embodiments, the machine 900 can operate as a standalone device or can be connected (e.g., networked) to other machines. In a networked deployment, the machine 900 can operate in the capacity of a server machine, a client machine, or both in server-client network environments. In an example, the machine 900 can act as a peer machine in peer-to-peer (P2P) (or other distributed) network environment. The machine 900 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein (e.g., authenticating transmissions from machines in a job group, generating coverage maps and reports, relaying coverage data, capturing and conditioning sensor information, such as generated by the sensors 916, and generating guidance information to avoid double coverage of field being processed), such as cloud computing, software as a service (SaaS), other computer cluster configurations.

The machine (e.g., computer system) 900 can include a hardware processor 902 (e.g., control module, a central processing unit (CPU), a graphics processing unit (GPU), a hardware processor core, or any combination thereof), a main memory 904, a static memory (e.g., memory or storage for firmware, microcode, a basic-input-output (BIOS), unified extensible firmware interface (UEFI), etc.) 906, and mass storage 908 (e.g., hard drive, tape drive, flash storage, or other block devices) some or all of which can communicate with each other via an interlink (e.g., bus) 930. The machine 900 can further include a display unit 910, an alphanumeric input device 912 (e.g., a keyboard), and a user interface (UI) navigation device 914 (e.g., a mouse). In an example, the display unit 910, input device 912 and UI navigation device 914 can be a touch screen display. The machine 900 can additionally include a storage device (e.g., drive unit) 908, a network interface device 920, and one or more sensors 916, such as sensor assemblies as defined herein, a global positioning system (GPS) sensor, radar, LIDAR, vision-based, compass, accelerometer, or other sensor. The machine 900 can include an output controller 928, such as machine controller, a serial (e.g., universal serial bus (USB), parallel, or other wired or wireless (e.g., infrared (IR), near field communication (NFC), etc.) connection to communicate or control one or more peripheral devices (e.g., an agricultural machine, a printer, card reader, etc.).

Registers of the processor 902, the main memory 904, the static memory 906, or the mass storage 908 can be, or include, a machine readable medium 922 on which is stored one or more sets of data structures or instructions 924 (e.g., software) embodying or utilized by any one or more of the techniques or functions described herein. The instructions 924 can also reside, completely or at least partially, within any of registers of the processor 902, the main memory 904, the static memory 906, or the mass storage 908 during execution thereof by the machine 900. In an example, one or any combination of the hardware processor 902, the main memory 904, the static memory 906, or the mass storage 908 can constitute the machine readable media 922. While the machine readable medium 922 is illustrated as a single medium, the term "machine readable medium" can include a single medium or multiple media (e.g., a centralized or distributed database, and/or associated caches and servers) configured to store the one or more instructions 924.

The term "machine readable medium" include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 can be further transmitted or received over a communications network 926 using a transmission medium via the network interface device 920 utilizing any one of a number of transfer protocols (e.g., frame relay, internee protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, peer-to-peer (P2P) networks, among others. In an example, the network interface device 920 can include one or more physical jacks (e.g., Ethernet, coaxial, or phone jacks) or one or more antennas to connect to the communications network 926. In an example, the network interface device 920 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software. A transmission medium is a machine readable medium.

VARIOUS ASPECTS AND EXAMPLES

Example 1 is a row steering system of an agricultural machine, the row steering system comprising: a first sensor assembly configured to detect a first orientation of the agricultural machine relative to a path reference in a field using a first sensor configured to measure a first characteristic; a second sensor assembly configured to detect a second orientation of the agricultural machine relative to the crop rows in the field using a second sensor configured to measure a second characteristic different than the first characteristic; and a control module including: a first, evaluation module to obtain a first confidence in the detected first, orientation; a second evaluation module to obtain a second confidence in the detected second orientation; and a selector module to selectively provide one or more of the detected first orientation or the detected second orientation to a machine controller of the agricultural machine based on the first and second confidences.

In Example 2, the subject matter of Example 1 includes, wherein the first sensor is an optical sensor and the second sensor is a radar sensor.

In Example 3, the subject matter of Examples 1-2 includes, wherein the first and second sensors are each optical sensors.

In Example 4, the subject matter of Examples 1-3 includes, wherein the first and second sensors are radar sensors.

In Example 5, the subject matter of Examples 1-4 includes, wherein the first sensor or the second sensor comprises at least one of an optical sensor, radar sensor, a global positioning sensor, an acoustic sensor, a LIDAR sensor, or a tactile sensor.

In Example 6, the subject matter of Examples 1-5 includes, wherein the first sensor assembly is configured to couple to the agricultural machine at an elevated location relative to the path reference, and the first sensor is configured to detect the first orientation from the elevated location directed toward the path reference.

In Example 7, the subject matter of Example 6 includes, wherein the second sensor assembly is configured to couple to the agricultural machine at a lateral location relative to the path reference, and the second sensor is configured to detect the second orientation from the lateral location directed across the path reference.

In Example 8, the subject matter of Examples 1-7 includes, wherein the first and second orientation comprise: a translational difference between a location of the agricultural machine and the path reference; and an angular difference between an angular orientation of the agricultural machine and the path reference.

In Example 9, the subject matter of Examples 1-8 includes, wherein the selector module includes: a weighting module configured to weight the first and second orientations based on one or more of the respective first or second confidences; an orientation combiner configured to determine a combined orientation including the weighted first and second orientations; and wherein the selector module configured to selectively provide one or more of the detected first orientation or the detected second orientation to the machine controller is configured to provide the combined orientation to the machine controller.

In Example 10, the subject matter of Examples 1-9 includes, wherein the selector module includes: a comparator configured to compare the first confidence to the second confidence; a selector module configured to selectively provide the first orientation to the machine controller responsive to the first confidence being larger than the second confidence or provide the second orientation to the machine controller responsive to the second confidence being larger than the first confidence.

In Example 11, the subject matter of Examples 1-10 includes, wherein the path reference includes at least one of a guidance path, a guidance line, or one or more crop rows.

Example 12 is a system for steering an agricultural machine relative to guidance path, the system comprising: a sensor module including: a first sensor assembly configured to obtain a first orientation of the agricultural machine relative to the guidance path based on a first measured characteristic; and a second sensor assembly configured to obtain a second orientation of the agricultural machine relative to the guidance path based on a second measured characteristic; an evaluation module configured to obtain a first confidence in the first orientation based on the first sensor assembly and a second confidence in the second orientation based on the second sensor assembly; and a combining module configured to generate a combined orientation of the agricultural machine based on a weighted combination of the first orientation and the second orientation, the combining module having: a weighting module configured to assign first and second weights to respective first and second orientations based on one or more of the respective first or second confidences; and a combiner module to generate the combined orientation using the weighted first and second orientations; and an interface configured to communicate the combined orientation to a machine controller.

In Example 13, the subject matter of Example 12 includes, wherein: the first orientation of the agricultural machine includes a first position of the agricultural machine relative to the guidance path and a first angle between the agricultural machine and the guidance path as observed with the first sensor assembly; and the second orientation of the agricultural machine includes a second position of the agricultural machine relative to the guidance path and second first angle between the agricultural machine and the guidance path as observed with the second sensor assembly.

In Example 14, the subject matter of Example 13 includes, wherein the weighting module includes: a position combiner configured to generate a composite position from the first and second positions based on the weighted first and second orientations; an angle combiner configured to generate a composite angle from the first and second angles based on the weighted first and second orientations; and an association module configured to generate a composite orientation including the combined position and the combined angle.

In Example 15, the subject matter of Example 14 includes, wherein the weighted first orientation and the weighted second orientation include first and second gains, respectively, and the first and second gains are normalized to sum to 1.

In Example 16, the subject matter of Example 15 includes, wherein the weighted first orientation and the weighted second orientation are based on the first confidence and the second confidence, respectively.

In Example 17, the subject matter of Examples 14-16 includes, wherein the weighting module is configured to set the first gain to zero (0) and the second gain to one (1) responsive to first confidence falling below a specified threshold value.

In Example 18, the subject matter of Examples 14-17 includes, wherein the weighting module is configured to set the first gain to zero (0) and the second gain to one (1) responsive to the second confidence exceeding the first confidence by a threshold value.

In Example 19, the subject matter of Examples 14-18 includes, a weight modulator in communication with the weighting module, the weight modulator is configured to adjust the first weight of the first orientation according to the second measured characteristic of the second sensor assembly.

In Example 20, the subject matter of Example 19 includes, wherein the weighting module is configured to decrease the first weight of the first orientation according to the second measured characteristic of the second sensor assembly indicating a decreased capability of the first sensor assembly to measure the first measured characteristic.

Example 21 is a method for controlling an agricultural machine according to guidance path, the method comprising: obtaining a first orientation of the agricultural machine relative to the guidance path with a first sensor; obtaining a second orientation of the agricultural machine relative to the guidance path with a second sensor; obtaining a first confidence of the first orientation and a second confidence of the second orientation; and generating a combined orientation of the agricultural machine by: comparing the first confidence with the second confidence; assigning a first and second weights to the respective first and second orientations based on the comparison; and generating the combined orientation using the weighted first and second orientations; and providing the combined orientation to a machine controller for steering the agricultural machine.

In Example 22, the subject matter of Example 21 includes, configuring the first sensor to couple to the agricultural machine at an elevated location relative to the path reference for detecting the first orientation from the elevated location directed toward the path reference; and configuring the second sensor to couple to the agricultural machine at a lateral location relative to the path reference for detecting the second orientation from the lateral location directed across the path reference.

In Example 23, the subject matter of Example 22 includes, wherein obtaining the first confidence comprises decreasing the first confidence relative to the second confidence responsive to a detected increase in a height of crops in the guidance path.

In Example 24, the subject matter of Examples 22-23 includes, wherein obtaining the first confidence comprises decreasing the first confidence relative to the second confidence responsive to a detected increase in a size of density of a canopy of crops in the path reference.

In Example 25, the subject matter of Examples 22-24 includes, wherein obtaining the first confidence comprises increasing the first confidence relative to the second confidence responsive to a detected curvature in the path reference.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25.

Example 28 is a system to implement of any of Examples 1-25.

Example 29 is a method to implement of any of Examples 1-25.

Aspects or examples of the present disclosure discuss incremental control or incremental updating. As used herein, the term incremental control or incremental updating can include updating by a fixed value, such as by incrementing the value of a counter. The term incremental control or incremental updating can also include updating by a value at least once in a cycle over a set or sequence of one or more cycles. The term incremental control or incremental updating can also include updating the value of a counter at a frequency of less than once a cycle over a set or sequence of one or more cycles, such that more than one cycle elapses between updates.

Aspects or examples of the present disclosure discuss a weighted gate driver, a weighted delay circuit, or other weighted components. As used herein, the term weighted includes using a numeric value or any other signal that can take on one or more values, to determine or adjust the operation of a circuit, such as a gate driver or delay circuit. The term weighted can include any form of encoding information in the numeric value or other signal, such as binary and unary encoding. The term weighted is not limited to any particular encoding technique.

Each of the non-limiting aspects or examples described herein may stand on its own or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the inventive subject matter should be determined with reference to the appended claims, along with the full scope of equivalents to which such claims are entitled.

The claimed invention is:

1. A row steering system of an agricultural machine, the row steering system comprising:
    a first sensor assembly configured to detect a first orientation of the agricultural machine relative to a path reference in a field using a first sensor configured to measure a first characteristic;
    a second sensor assembly configured to detect a second orientation of the agricultural machine relative to crop rows in the field using a second sensor configured to measure a second characteristic different than the first characteristic; and
    one or more processors configured to:
        calculate a first confidence in the detected first orientation using a combination of signal quality and line-fit quality of the detected first orientation, wherein the signal quality is determined based on differentiation of a crop or row indicator from a soil or furrow indicator achieving a differentiation threshold, and the line-fit quality is determined based on a comparison of a fitted line to calculated row positions;
        calculate a second confidence in the detected second orientation using a combination of signal quality and line-fit quality of the detected second orientation; and
        automatically control the agricultural machine based on the first and second confidences.

2. The row steering system of claim 1, wherein the first sensor is an optical sensor and the second sensor is a radar sensor.

3. The row steering system of claim 1, wherein the first and second sensors are optical sensors.

4. The row steering system of claim 1, wherein the first and second sensors are radar sensors.

5. The row steering system of claim 1, wherein the first sensor or the second sensor comprises at least one of an optical sensor, radar sensor, a global positioning sensor, an acoustic sensor, a LIDAR sensor, or a tactile sensor.

6. The row steering system of claim 1, wherein the first sensor assembly is configured to couple to the agricultural machine at an elevated location relative to the path reference, and the first sensor is configured to detect the first orientation from the elevated location directed toward the path reference.

7. The row steering system of claim 6, wherein the second sensor assembly is configured to couple to the agricultural machine at a lateral location relative to the path reference, and the second sensor is configured to detect the second orientation from the lateral location directed across the path reference.

8. The row steering system of claim 1, wherein the first and second orientation comprise:
a translational difference between a location of the agricultural machine and the path reference; and
an angular difference between an angular orientation of the agricultural machine and the path reference.

9. The row steering system of claim 1, wherein the one or more processors are further configured to:
weight the first and second orientations based on one or more of the respective first or second confidences;
determine a combined orientation including the weighted first and second orientations; and
selectively provide one of the detected first orientation, the detected second orientation, or the combined orientation to a machine controller.

10. The row steering system of claim 1, wherein the one or more processors are further configured to:
compare the first confidence to the second confidence; and
selectively provide the first orientation to a machine controller responsive to the first confidence being larger than the second confidence or provide the second orientation to the machine controller responsive to the second confidence being larger than the first confidence.

11. The row steering system of claim 1, wherein the path reference includes at least one of a guidance path, a guidance line, or one or more crop rows.

12. A system for steering an agricultural machine relative to guidance path, the system comprising:
a sensor module including:
a first sensor assembly configured to obtain a first orientation of the agricultural machine relative to the guidance path based on a first measured characteristic; and
a second sensor assembly configured to obtain a second orientation of the agricultural machine relative to the guidance path based on a second measured characteristic;
one or more processors configured to automatically control the agricultural machine, the one or more processors are configured to:
calculate a first confidence in the first orientation based on the first sensor assembly using a combination of signal quality and line-fit quality of the first orientation and calculate a second confidence in the second orientation based on the second sensor assembly using a combination of signal quality and line-fit quality of the second orientation, wherein the signal quality is determined based on differentiation of a crop or row indicator from a soil or furrow indicator achieving a differentiation threshold, and the line-fit quality is determined based on a comparison of a fitted line to calculated row positions;
generate a combined orientation of the agricultural machine based on a weighted combination of the first orientation and the second orientation;
assign first and second weights to respective first and second orientations based on one or more of the respective first or second confidences; and
generate the combined orientation using the weighted first and second orientations;
an interface configured to communicate the combined orientation; and
a machine controller configured to automatically control the agricultural machine using the combined orientation received from the interface.

13. The system of claim 12, wherein:
the first orientation of the agricultural machine includes a first position of the agricultural machine relative to the guidance path and a first angle between the agricultural machine and the guidance path as observed with the first sensor assembly; and
the second orientation of the agricultural machine includes a second position of the agricultural machine relative to the guidance path and second angle between the agricultural machine and the guidance path as observed with the second sensor assembly.

14. The system of claim 13, wherein the one or more processors are further configured to:
generate a composite position from the first and second positions based on the weighted first and second orientations;
generate a composite angle from the first and second angles based on the weighted first and second orientations; and
generate a composite orientation including the composite position and the composite angle.

15. The system of claim 14, wherein the weighted first orientation and the weighted second orientation include first and second gains, respectively, and the first and second gains are normalized to sum to 1.

16. The system of claim 15, wherein the weighted first orientation and the weighted second orientation are based on the first confidence and the second confidence, respectively.

17. The system of claim 14, wherein the weighting module is configured to set a first gain to zero (0) and a second gain to one (1) responsive to first confidence falling below a specified threshold value.

18. The system of claim 14, wherein the one or more processors are further configured to set a first gain to zero (0) and a second gain to one (1) responsive to the second confidence exceeding the first confidence by a threshold value.

19. The system of claim 14, wherein the one or more processors are further configured to:
adjust the first weight of the first orientation according to the second measured characteristic of the second sensor assembly.

20. The system of claim 19, wherein the one or more processors are further configured to decrease the first weight of the first orientation according to the second measured characteristic of the second sensor assembly indicating a decreased capability of the first sensor assembly to measure the first measured characteristic.

21. A method for controlling an agricultural machine according to guidance path, the method comprising:
obtaining a first orientation of the agricultural machine relative to the guidance path with a first sensor;
obtaining a second orientation of the agricultural machine relative to the guidance path with a second sensor;
calculating a first confidence of the first orientation using a combination of signal quality and line-fit quality of the first orientation and calculating a second confidence of the second orientation using a combination of signal quality and line-fit quality of the second orientation;
calculating the signal quality based on differentiation of a crop or row indicator from a soil or furrow indicator achieving a differentiation threshold;
calculating the line-fit quality based on a comparison of a fitted line to calculated row positions;
generating a combined orientation of the agricultural machine by:
comparing the first confidence with the second confidence;

assigning a first and second weights to the respective first and second orientations based on the comparing; and generating the combined orientation using the weighted first and second orientations; and automatically controlling the agricultural machine using the combined orientation.

22. The method of claim 21, further comprising:

configuring the first sensor to couple to the agricultural machine at an elevated location relative to a path reference for detecting the first orientation from the elevated location directed toward the path reference; and configuring the second sensor to couple to the agricultural machine at a lateral location relative to the path reference for detecting the second orientation from the lateral location directed across the path reference.

23. The method of claim 22, wherein obtaining the first confidence comprises decreasing the first confidence relative to the second confidence responsive to a detected increase in a height of crops in the guidance path.

24. The method of claim 22, wherein obtaining the first confidence comprises decreasing the first confidence relative to the second confidence responsive to a detected increase in a size of density of a canopy of crops in the path reference.

25. The method of claim 22, wherein obtaining the first confidence comprises increasing the first confidence relative to the second confidence responsive to a detected curvature in the path reference.

* * * * *